United States Patent
Limberg

(10) Patent No.: US 6,480,233 B1
(45) Date of Patent: Nov. 12, 2002

(54) NTSC CO-CHANNEL INTERFERENCE DETECTORS RESPONSIVE TO RECEIVED Q-CHANNEL SIGNALS IN DIGITAL TV SIGNAL RECEIVERS

(75) Inventor: Allen LeRoy Limberg, Vienna, VA (US)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/269,659

(22) PCT Filed: Oct. 2, 1997

(86) PCT No.: PCT/US97/16931

§ 371 (c)(1),
(2), (4) Date: Apr. 1, 1999

(87) PCT Pub. No.: WO98/15120

PCT Pub. Date: Apr. 9, 1998

(51) Int. Cl.[7] ............................. H04N 5/38; H04N 7/04
(52) U.S. Cl. ......................... 348/470; 348/21; 348/607; 348/726; 375/321
(58) Field of Search .......................... 348/21, 470, 607, 348/614, 726, 609, 727, 475, 493; 375/346, 348, 349, 350, 321; H04N 5/38, 7/04

(56) References Cited

U.S. PATENT DOCUMENTS

| | | | | | |
|---|---|---|---|---|---|
| 5,162,900 A | * | 11/1992 | Citta | ........................... | 348/571 |
| 5,526,062 A | * | 6/1996 | Harford | ..................... | 348/475 |
| 5,546,132 A | * | 8/1996 | Kim et al. | .................... | 348/21 |
| 5,548,344 A | * | 8/1996 | Park | ............................ | 348/536 |
| 5,636,251 A | * | 6/1997 | Citta et al. | ................... | 375/341 |
| 5,673,293 A | * | 9/1997 | Scarpa et al. | ............... | 375/321 |
| 5,696,559 A | * | 12/1997 | Kim | ............................... | 348/691 |
| 5,731,848 A | * | 3/1998 | Patel et al. | .................. | 348/614 |
| 5,745,187 A | * | 4/1998 | Hulyalkar et al. | ............ | 348/21 |
| 5,798,803 A | * | 8/1998 | Limberg | ...................... | 348/21 |
| 5,821,988 A | * | 10/1998 | Citta et al. | .................... | 348/21 |
| 5,835,131 A | * | 11/1998 | Limberg | ...................... | 348/21 |
| 5,875,001 A | * | 2/1999 | Kwak | ......................... | 348/607 |
| 6,023,306 A | * | 2/2000 | Limberg | ...................... | 348/21 |
| 6,057,877 A | * | 5/2000 | Limberg | ...................... | 348/21 |
| 6,184,942 B1 | * | 2/2001 | Patel et al. | .................. | 348/558 |
| 6,201,564 B1 | * | 3/2001 | Limberg | ...................... | 348/21 |
| 6,249,559 B1 | * | 6/2001 | Jun | ............................ | 329/308 |

* cited by examiner

Primary Examiner—John Miller
Assistant Examiner—Brian P. Yenke
(74) Attorney, Agent, or Firm—Robert E. Bushnell, Esq.

(57) ABSTRACT

An NTSC co-channel interference detector (44) detects the presence of an interfering NTSC signal in the received Q-channel signal that is orthogonal to the received I-channel signal, rather than detecting the presence of an interfering NTSC signal in the received I-channel signal. By determining whether or not a significant amount of NTSC co-channel interference accompanies the received Q-channel signal, it is inferentially determined whether or not a significant amount of NTSC co-channel interference accompanies the received I-channel signal, such as to cause too many errors in the trellis decoding of equalized received I-channel signal to be corrected by the Reed-Solomon decoder (40) following the trellis decoder (34). The accurate determination of co-channel NTSC interference levels is simplified, because essentially no direct bias arises from the quadrature-phase synchronous detection of the pilot carrier of the VSB AM digital television signal.

19 Claims, 16 Drawing Sheets

NTSC CO-CHANNEL INTERFERENCE DETECTORS RESPONSIVE TO RECEIVED Q-CHANNEL SIGNALS IN DIGITAL TV SIGNAL RECEIVERS

The present invention relates to digital television systems, and more particularly, to circuits employed in the digital television receiver for determining whether or not there is co-channel interference from NTSC analog television signals.

BACKGROUND OF THE INVENTION

A Digital Television Standard published Sep. 16, 1995 by the Advanced Television Subcommittee (ATSC) specifies vestigial sideband (VSB) signals for transmitting digital television (DTV) signals in 6-MHz-bandwidth television channels such as those currently used in over-the-air broadcasting of National Television Subcommittee (NTSC) analog television signals within the United States. The VSB DTV signal is designed so its spectrum is likely to interleave with the spectrum of a co-channel interfering NTSC analog TV signal. This is done by positioning the pilot carrier and the principal amplitude-modulation sideband frequencies of the DTV signal at odd multiples of one-quarter the horizontal scan line rate of the NTSC analog TV signal that fall between the even multiples of one-quarter the horizontal scan line rate of the NTSC analog TV signal, at which even multiples most of the energy of the luminance and chrominance components of a co-channel interfering NTSC analog TV signal will fall. The video carrier of an NTSC analog TV signal is offset 1.25 MHz from the lower limit frequency of the television channel. The carrier of the DTV signal is offset from such video carrier by 59.75 times the horizontal scan line rate of the NTSC analog TV signal, to place the carrier of the DTV signal about 309,877.6 kHz from the lower limit frequency of the television channel. Accordingly, the carrier of the DTV signal is about 2,690122.4 Hz from the middle frequency of the television channel.

The exact symbol rate in the Digital Television Standard is (684/286) times the 4.5 MHz sound carrier offset from video carrier in an NTSC analog TV signal. The number of symbols per horizontal scan line in an NTSC analog TV signal is 684, and 286 is the factor by which horizontal scan line rate in an NTSC analog TV signal is multiplied to obtain the 4.5 MHz sound carrier offset from video carrier in an NTSC analog TV signal. The symbol rate is 10.762238 megasymbols per second, which can be contained in a VSB signal extending 5.381119 MHz from DTV signal carrier. That is, the VSB signal can be limited to a band extending 5.690997 MHz from the lower limit frequency of the television channel.

The ATSC standard for digital HDTV signal terrestrial broadcasting in the United States of America is capable of transmitting either of two high-definition television (HDTV) formats with 16:9 aspect ratio. One HDTV display format uses 1920 samples per scan line and 1080 active horizontal scan lines per 30 Hz frame with 2:1 field interlace. The other HDTV display format uses 1280 luminance samples per scan line and 720 progressively scanned scan lines of television image per 60 Hz frame. The ATSC standard also accommodates the transmission of DTV display formats other than HDTV display formats, such as the parallel transmission of four television signals having normal definition in comparison to an NTSC analog television signal.

DTV transmitted by vestigial-sideband (VSB) amplitude modulation (AM) during terrestrial broadcasting in the United States of America comprises a succession of consecutive-in-time data fields each containing 313 consecutive-in-time data segments. The data fields may be considered to be consecutively numbered modulo-2, with each odd-numbered data field and the succeeding even-numbered data field forming a data frame. The frame rate is 20.66 frames per second. Each data segment is of 77.3 microseconds duration. So, with the symbol rate being 10.76 MHz there are 832 symbols per data segment. Each segment of data begins with a line synchronization code group of four symbols having successive values of +S, −S, −S and +S. The value +S is one level below the maximum positive data excursion, and the value −S is one level above the maximum negative data excursion. The initial line of each data field includes a field synchronization code group that codes a training signal for channel-equalization and multipath suppression procedures. The training signal is a 511-sample pseudo-noise sequence (or "PN-sequence") followed by three 63-sample PN sequences. The middle ones of the 63-sample PN sequences in the field synchronization codes are transmitted in accordance with a first logic convention in the first line of each odd-numbered data field and in accordance with a second logic convention in the first line of each even-numbered data field, the first and second logic conventions being one's complementary respective to each other.

The data within data lines are trellis coded using twelve interleaved trellis codes, each a 2/3 rate trellis code with one uncoded bit. The interleaved trellis codes are subjected to Reed-Solomon forward error-correction coding, which provides for correction of burst errors arising from noise sources such as a nearby unshielded automobile ignition system. The Reed-Solomon coding results are transmitted as 8-level (3 bits/symbol) one-dimensional-constellation symbol coding for over-the-air transmission, which transmissions are made without symbol precoding separate from the trellis coding procedure. The Reed-Solomon coding results are transmitted as 16-level (4 bits/symbol) one-dimensional-constellation symbol coding for cablecast, which transmissions are made without preceding. The VSB signals have their natural carrier wave, which would vary in amplitude depending on the percentage of modulation, suppressed.

The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 4-bit symbol coding have normalized values of −7, −5, −3, −1, +1, +3, +5 and +7 in the carrier modulating signal, the pilot carrier has a normalized value of 1.25. The normalized value of +S is +5, and the normalized value of −S is −5.

In the earlier development of the DVT art it was contemplated that the DTV broadcaster might be called upon to decide whether or not to use a symbol precoder at the transmitter, which symbol precoder would follow the symbol generation circuitry and provide for matched filtering of symbols, when used together with a comb filter in each DTV signal receiver used before the data-slicer in the symbol decoder circuitry as a symbol post-coder. This decision would have depended upon whether interference from a co-channel NTSC broadcasting station were expected or not. Symbol precoding would not have been used for data line synchronization code groups or during data lines in which data field synchronization data were transmitted. Co-channel interference is reduced at greater distances from the NTSC broadcasting station(s) and is more likely to occur when certain ionospheric conditions obtain, the summertime months during years of high solar activity being notorious for likelihood of co-channel interference. Such interference will not obtain if there are no co-channel NTSC broadcasting stations, of course. If there were likelihood of NTSC interference within his area of broadcast coverage, it was presumed that the HDTV broadcaster would use the symbol precoder to facilitate the HDTV signal being more easily separated from NTSC interference; and, accordingly, a comb filter would be employed as symbol post-coder in the DTV signal receiver to complete matched filtering. If there were no-possibility of NTSC interference or there were insubstantial likelihood thereof, in order that flat spectrum noise would be less likely to cause erroneous decisions as to symbol values in the trellis decoder, it was presumed that the DTV broadcaster would discontinue using the symbol precoder; and, accordingly, the symbol post-coder would then be disabled in each DTV signal receiver.

U.S. Pat. No. 5,260,793 issued Nov. 9, 1993 to R. W. Citta et alii and entitled "RECEIVER POST CODER SELECTION CIRCUIT" selectively employs a post-coder comb filter for suppressing NTSC interference accompanying a real or in-phase baseband component (I channel) of the complex output signal of a demodulator used in a digital high-definition television (HDTV) receiver. The presence of NTSC interference in the I-channel component of the demodulator response is detected for developing control signals automatically to enable or disable the comb filter being used for suppressing NTSC co-channel interference. During each data field sync interval, the input signal to and the output signal from an NTSC suppression filter of comb filter type in the HDTV signal receiver are each compared with a respective signal that is known a priori and is drawn from memory within the HDTV signal receiver. If the minimum result of comparison with the input signal has less energy than the minimum result of comparison with the output signal from the NTSC suppression filter, this is indicative that the primary cause of variance from expected reception is random noise rather than NTSC co-channel interference. Insofar as the particular digital television receiver is concerned. reception would be better were precoding and post-coding not employed in the system, and it is presumed that the broadcaster has not employed precoding. If the minimum result of comparison with the input signal has more energy than the minimum result of comparison with the output signal from the NTSC suppression filter, this is indicative that the primary cause of variance from expected reception is NTSC co-channel interference rather than random noise. Insofar as the particular digital television receiver is concerned, reception would be better were preceding and post-coding employed in the system, and it is presumed that the broadcaster has employed precoding.

U.S. Pat. No. 5,546,132 issued Aug. 13, 1996 to K. S. Kim et alii and entitled "NTSC INTERFERENCE DETECTOR" describes the use of post-coder comb filtering for suppressing co-channel NTSC interference when the presence of such interference is detected in NTSC-extraction comb filter response to the I channel. U.S. Pat. No. 5,546,132 does not specifically describe an imaginary or quadrature-phase baseband component (Q channel) of a complex output signal being supplied from the demodulator used in a digital HDTV signal receiver. A digital HDTV signal receiver that synchrodynes the VSB AM signals to baseband commonly employs a demodulator that includes an in-phase synchronous detector for supplying received I-channel signal for trellis decoding (after post-coding, if precoding is used at the transmitter) and further includes a quadrature-phase synchronous detector for supplying received Q-channel signal. The received Q-channel signal is lowpass filtered to generate an automatic frequency and phase control (AFPC) signal for the local oscillator supplying carrier for synchrodyning. The specification and drawing of U.S. Pat. No. 5,479,449 issued Dec. 26, 1996 to C. B. Patel and A. L. R. Limberg, entitled "DIGITAL VSB DETECTOR WITH BANDPASS PHASE TRACKER, AS FOR INCLUSION IN AN HDTV RECEIVER", and assigned to Samsung Electronics Co., Ltd., is incorporated herein by reference. The reader's attention is specifically directed to elements 22–27 in FIG. 1 of the drawing of U.S. Pat. No. 5,479,449 and the description thereof in the accompanying specification. These elements are used in the described HDTV signal receiver for carrying out complex demodulation of the VSB AM final intermediate-frequency signal. U.S. Pat. No. 5,479,449 describes complex demodulation of the VSB AM final I-F signal being carried out in the digital regime. but in alternative digital TV receiver designs complex demodulation of the VSB AM final I-F signal is instead carried out in the analog regime.

In both U.S. Pat. Nos. 5,260,793 and 5,546,132 post-coding is enabled during times of substantial co-channel NTSC interference and otherwise disabled, with the control signal for such selective enablement being developed from the received I-channel signal. The determination of co-channel NTSC interference levels is complicated by the direct bias accompanying the co-channel NTSC interference, which direct bias arises from the in-phase synchronous detection of the pilot carrier of the VSB AM DTV signal. This is particularly a problem in DTV signal receivers in which automatic gain control does not tightly regulate the amplitude of the received I-channel signal recovered by in-phase synchronous detection.

The video carrier of an NTSC signal is 1.25 MHz from edge of the 6-MHz-wide broadcast channel, while the carrier for a DTV signal for terrestrial through-the-air broadcast is 310 kHz from edge of the 6-MHz-wide broadcast channel. A co-channel NTSC signal does not exhibit symmetrical amplitude-modulation sidebands with respect to the carrier of the vestigial-sideband amplitude-modulation (VSB AM) carrying digital information. Accordingly, artifacts of the NTSC video carrier at 940 kHz remove from DTV signal carrier and artifacts of its sidebands are not well canceled in the DTV signal as synchrodyned to baseband. Nor, of course, are artifacts of the NTSC audio carrier and its sidebands, the NTSC audio carrier being at 5.44 MHz remove from DTV signal carrier.

The Digital Television Standard the ATSC published Sep. 16, 1995 does not allow for the use of precoding of all data at the DTV transmitter to compensate for post-coding incidental to subsequent use of comb filtering in a DTV signal receiver to reject NTSC co-channel interference. Instead, only the initial symbol in the trellis decoding is precoded. This procedure by itself does not facilitate a DTV signal receiver using comb filtering to reject NTSC co-channel interference before data slicing procedures are undertaken. A DTV signal receiver that does not reject artifacts of NTSC co-channel interference before data slicing procedures are undertaken will not have good reception under strong NTSC co-channel interference conditions as may be caused by the DTV signal receiver being remote from the DTV transmitter or having an analog TV transmitter very closeby. In the DTV signal as synchrodyned to baseband the artifacts of the video carrier of a co-channel interfering NTSC color TV signal are at $59.75f_H$, $f_H$ being the horizontal scan frequency of that signal. The artifact of the color subcarrier is at $287.25f_H$, and the artifact of the unmodulated NTSC audio carrier is at $345.75f_H$. Comb filtering procedures are not entirely satisfactory for suppressing artifacts of the frequency-modulated NTSC audio carrier, particularly under conditions of frequency modulation in which carrier frequency deviation is large, since correlation (or anti-correlation) of samples of the FM carrier at times separated by any substantial fixed delay may not be particularly good, the inventor points out. The inventor recommends that the filtering used to establish the overall bandwidth of intermediate-frequency amplification be such as to reject the FM audio carrier of any co-channel interfering NTSC analog TV signal. Comb filtering procedures are more satisfactory for separating the baseband DTV signal from the artifacts of the NTSC video carrier, the low video frequencies, and the chrominance signal frequencies close to the color carrier. This is because these artifacts tend to exhibit good correlation between samples separated by certain specific delay intervals and to exhibit good anti-correlation between samples separated by certain other specific delay intervals.

In U.S. patent application Ser. No. 08/746,520 filed by the inventor on Nov. 12, 1996 and entitled "DTV RECEIVER WITH FILTER IN I-F CIRCUITRY TO SUPPRESS FM SOUND CARRIER OF NTSC CO-CHANNEL INTERFERING SIGNAL", the inventor advocates preceding data-slicing in a DTV signal receiver with comb filtering to suppress NTSC co-channel interference when that interference is sufficiently large as to affect data-slicing adversely. The inventor teaches how to compensate in the symbol decoding procedure for the effects of such comb filtering upon symbol coding when it is selectively done. It is, then, still useful to be able to determine when NTSC co-channel interference is larger than a prescribed value denominated as being acceptably small, so that this determination can be used for controlling the selective use of comb filtering to suppress NTSC co-channel interference.

NTSC co-channel interference will appear in the imaginary or quadrature-phase baseband component (Q channel) of the complex output signal of a demodulator used in a DTV signal receiver whenever NTSC co-channel interference appears in the real or in-phase baseband component (I channel) of that complex output signal. Accordingly, an NTSC interference detector can be arranged so that its NTSC extracting filter responds to the received Q-channel signal, rather than the received I-channel signal. By determining whether or not a significant amount of NTSC co-channel interference accompanies the received Q-channel signal, it is inferentially determined whether or not a significant amount of NTSC co-channel interference accompanies the received I-channel signal, such as to cause too many errors in the trellis decoding of equalized received I-channel signal to be corrected by the Reed-Solomon decoder following the trellis decoder. The accurate determination of co-channel NTSC interference levels is simplified. because essentially no direct bias arises from the quadrature-phase synchronous detection of the pilot carrier of the VSB AM DTV signal.

SUMMARY OF THE INVENTION

A method for processing vestigial-sideband amplitude-modulated digital television signals in a digital television signal receiver in accordance with an aspect of the invention comprises the following steps. A complex demodulation of vestigial-sideband amplitude-modulated digital television signals susceptible to co-channel NTSC interference is performed, to separate a received I-channel baseband signal and a received Q-channel baseband signal in an orthogonal relationship with said received I-channel baseband signal. Then, it is estimated whether artifacts of co-channel NTSC interference accompanying the received I-channel baseband signal are of significant level by determining whether further artifacts of co-channel NTSC interference accompanying the received Q-channel baseband signal exceed a prescribed level.

A method for determining, in accordance with an aspect of the invention, whether or not a digital television receiver is to employ comb filtering to suppress co-channel NTSC interference before trellis decoding comprises the following steps. A complex demodulation of digital television signals is performed to separate a received I-channel baseband signal and a received Q-channel baseband signal in an orthogonal relationship with the received I-channel baseband signal. Whether or not artifacts of co-channel NTSC interference that are of significant level accompany the received Q-channel baseband signal is determined. If no artifacts of co-channel NTSC interference of significant level are determined to accompany the received Q-channel baseband signal, the received I-channel baseband signal is symbol decoded without being comb filtered to generate decoded symbols for trellis decoding. If artifacts of co-channel NTSC interference of significant level are determined to accompany the received Q-channel baseband signal, the received I-channel baseband signal is comb filtered to generate comb-filtered I-channel baseband signal in which co-channel NTSC interference is suppressed, symbol decoding is performed on the comb-filtered I-channel baseband signal; and the result of symbol decoding responsive to the comb-filtered I-channel baseband signal is post-coded to generate decoded symbols for trellis decoding.

NTSC co-channel interference detectors embodying the invention in various of its aspects detect the presence of an interfering NTSC signal in the Q channel that is orthogonal to the I channel. Adaptive NTSC co-channel interference suppression circuitry embodying the invention in further of its aspects uses these NTSC co-channel interference detectors for controlling whether comb filtering is to be performed for suppressing NTSC co-channel interference in the I channel before data slicing in a digital television receiver.

Figure 1:
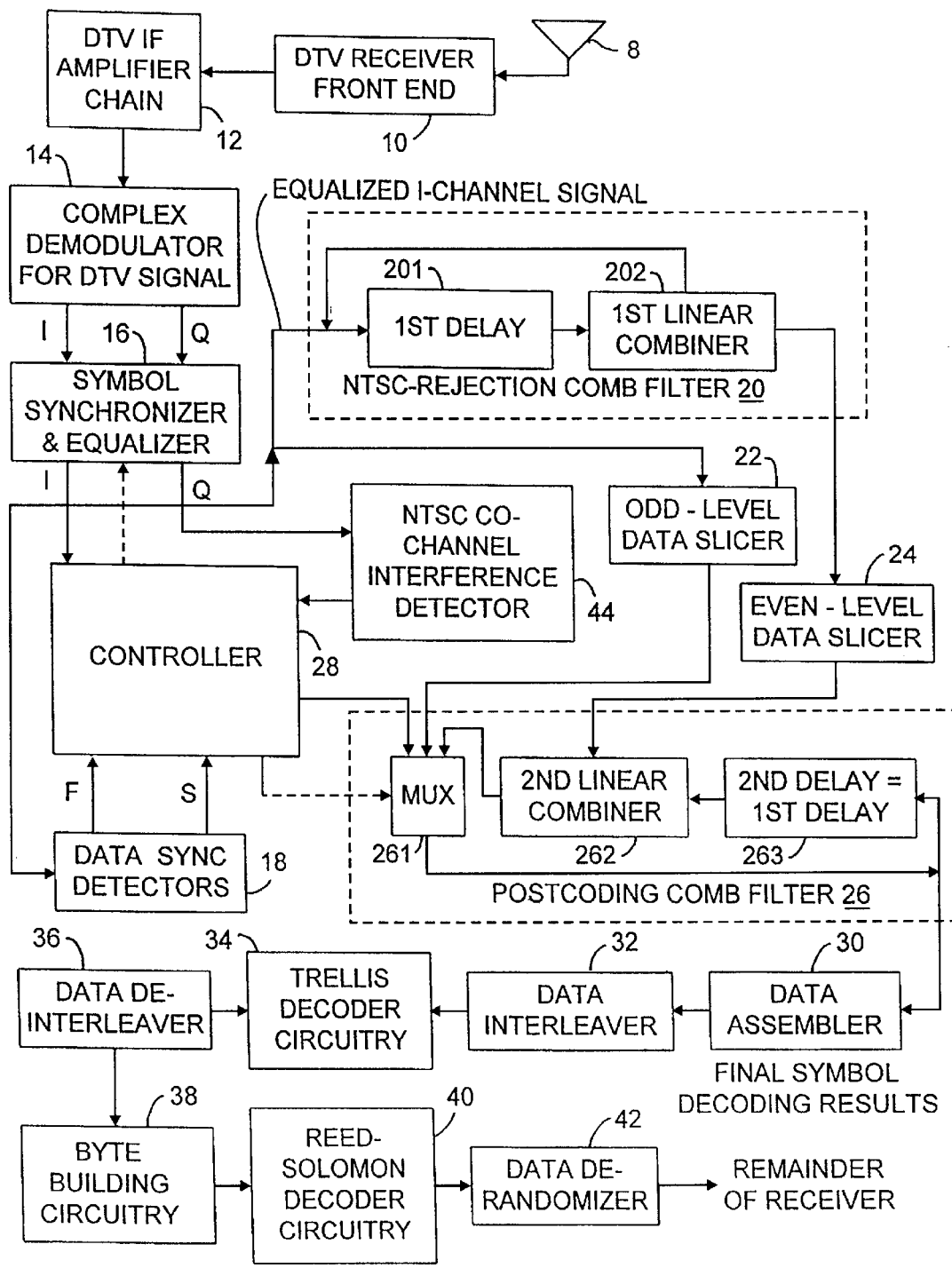
FIG. 1 is a block diagram of a portion of a digital television receiver that includes a symbol decoder with NTSC co-channel interference suppression circuitry which, in accordance with the invention, is selectively activated depending on the response of an NTSC co-channel interference detector responsive to the Q-channel signal from a complex demodulator for DTV signal.
Figure 14:
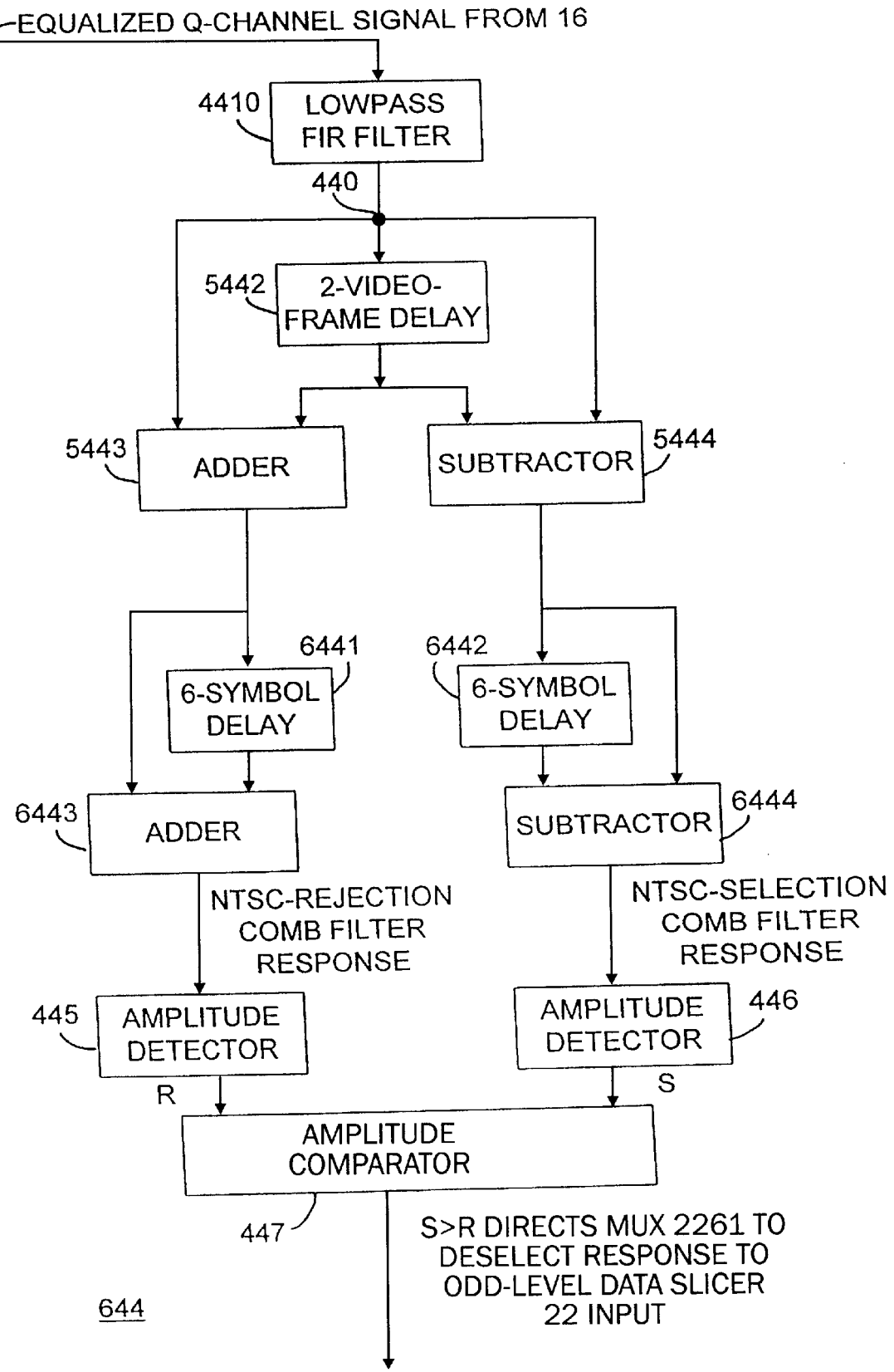
Figure 15:
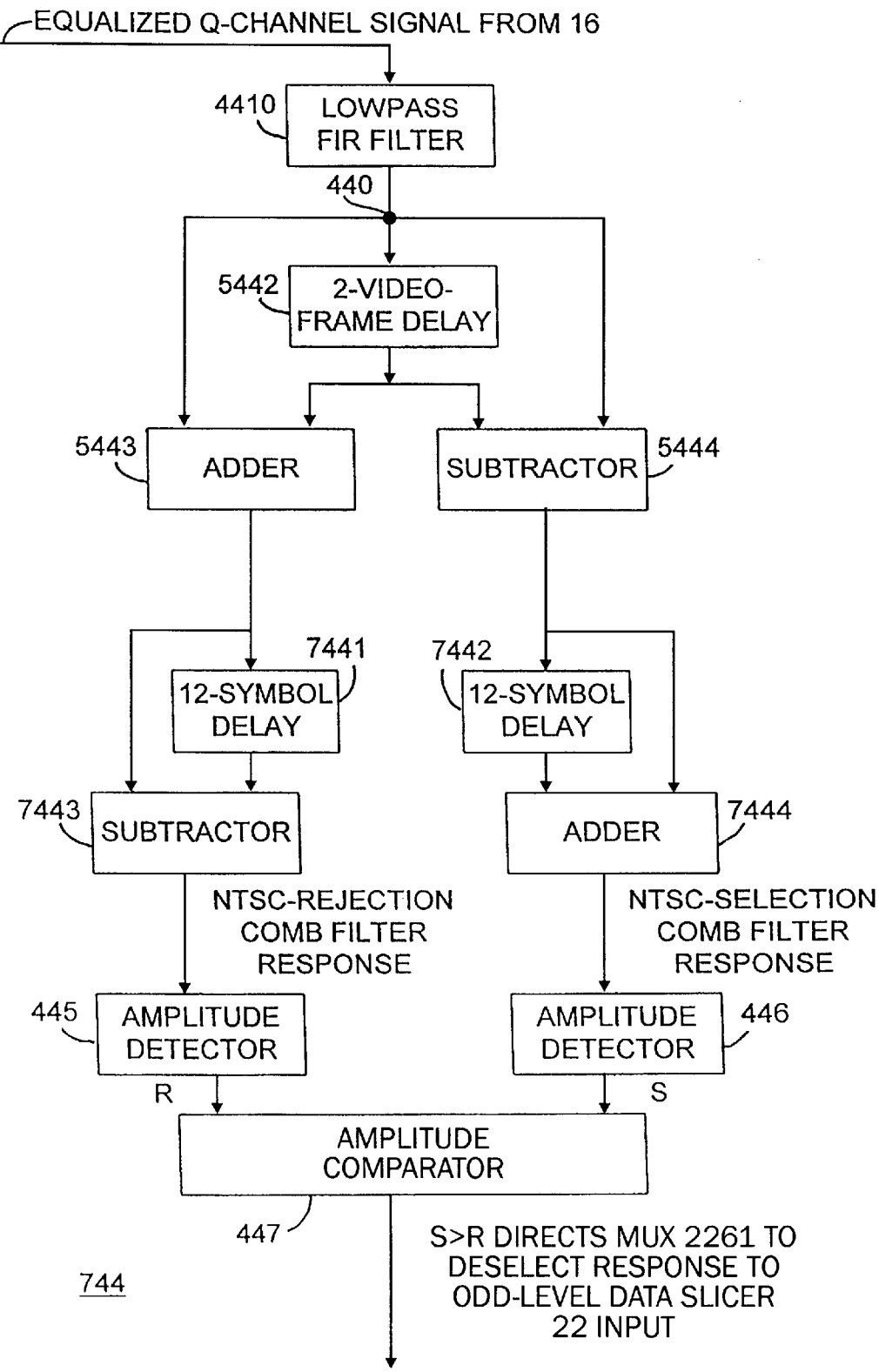

Each of FIGS. 14 and 15 is a block schematic diagram showing details of a respective alternative type of NTSC co-channel interference detector that can be employed in the FIG. 1 DTV signal receiver.

Figure 16:
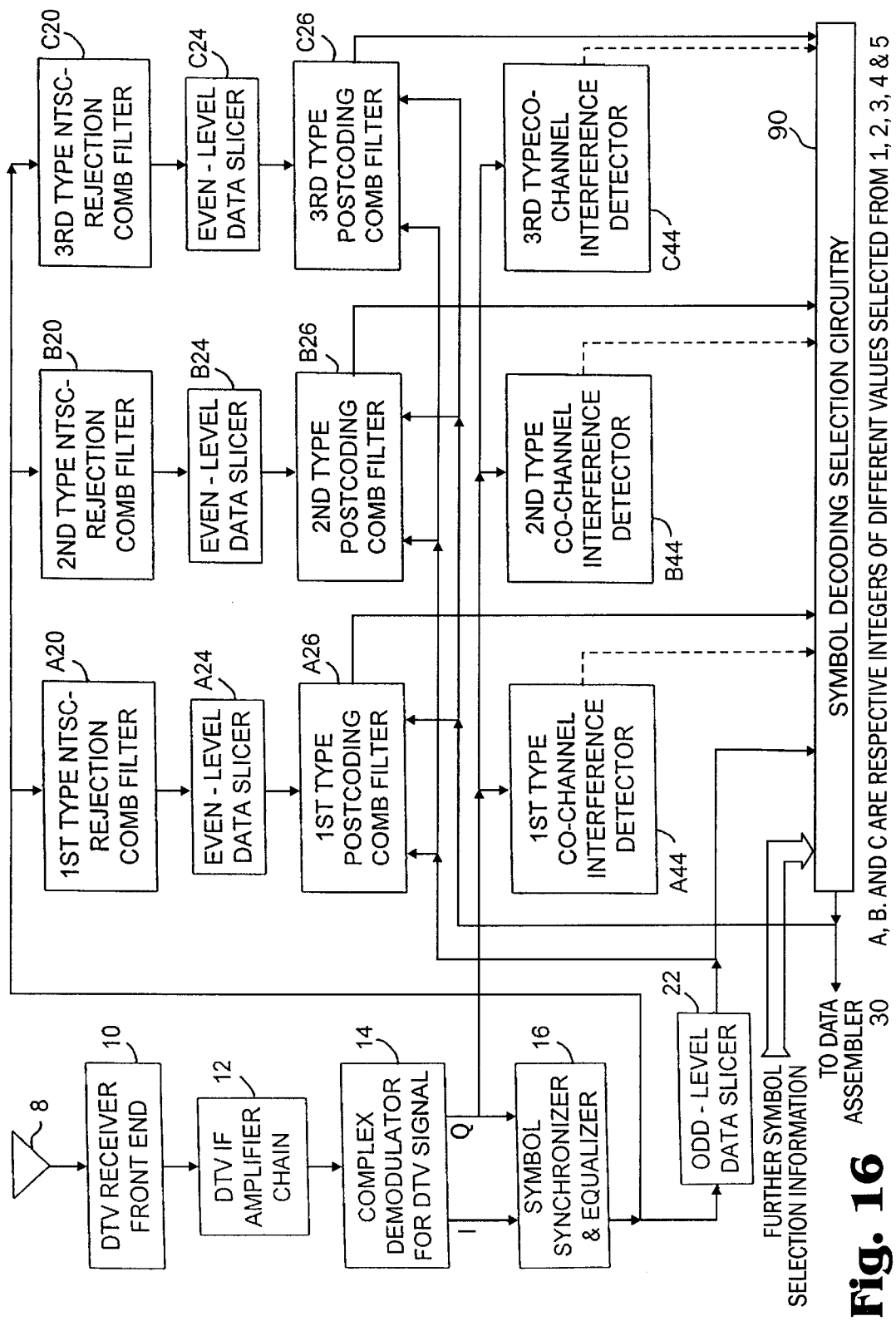

FIG. 16 is a block schematic diagram of a digital television receiver embodying the invention, in which DTV signal receiver a plurality of comb filters and associated NTSC co-channel interference detectors are employed for selectively filtering against artifacts of NTSC co-channel interference.

DETAILED DESCRIPTION OF THE PREFERRED EMBODIMENTS

At various points in the circuits shown in the FIGURES of the drawing, shimming delays have to be inserted in order that the sequence of operation is correct, as will be understood by those skilled in electronic design. Unless there is something out of the ordinary about a particular shimming delay requirement, it will not be explicitly referred to in the specification that follows.

FIG. 1 shows a digital television signal receiver used for recovering error-corrected data, which data are suitable for recording by a digital video cassette recorder (DVCR) or for MPEG-2 decoding and display in a television set. The FIG. 1 DTV signal receiver is shown as receiving television broadcast signals from a receiving antenna 8, but can receive the signals from a cable network instead. The television broadcast signals are supplied as input signal to "front end" electronics 10. The "front end" electronics 10 generally include a radio-frequency amplifier and first detector for converting radio-frequency television signals to intermediate-frequency television signals, supplied as input signal to an intermediate-frequency (IF) amplifier chain 12 for vestigial-sideband DTV signals. The DTV signal receiver is preferably of plural-conversion type with the IF amplifier chain 12 including an IF amplifier for amplifying DTV signals as converted to an ultra-high-frequency band by the first detector, a second detector for converting the amplified DTV signals to a very-high-frequency band, and a further IF amplifier for amplifying DTV signals as converted to the VHF band. If demodulation to baseband is performed in the digital regime, the IF amplifier chain 12 will further include a third detector for converting the amplified DTV signals to a final intermediate-frequency band closer to baseband.

Preferably, a surface-acoustic-wave (SAW) filter is used in the IF amplifier for the UHF band, to shape channel selection response and reject adjacent channels. This SAW filter cuts off rapidly just beyond 5.38 MHz remove from the suppressed carrier frequency of the VSB DTV signal and the pilot carrier, which is of like frequency and of fixed amplitude. This SAW filter accordingly rejects much of the frequency-modulated sound carrier of any co-channel interfering analog TV signal. Removing the FM sound carrier of any co-channel interfering analog TV signal in the IF amplifier chain 12 prevents artifacts of that carrier being generated when the final I-F signal is detected to recover baseband symbols and forestalls such artifacts interfering with data-slicing of those baseband symbols during symbol decoding. The prevention of such artifacts interfering with data-slicing of those baseband symbols during symbol decoding is better than can be accomplished by relying on comb-filtering before data-slicing, particularly if the differential delay in the comb filter is more than a few symbol epochs.

The final IF output signals from the IF amplifier chain 12 are supplied to a complex demodulator 14, which demodulates the vestigial-sideband amplitude-modulation DTV signal in the final intermediate-frequency band to recover a real baseband signal and an imaginary baseband signal. Demodulation may be done in the digital regime after analog-to-digital conversion of a final intermediate-frequency band in the few megacycle range as described in U. S. Pat. No. 5,479,449, for example. Alternatively, demodulation may be done in the analog regime, in which case the results are usually subjected to analog-to-digital conversion to facilitate further processing. The complex demodulation is preferably done by in-phase (I) synchronous demodulation and quadrature-phase (Q) synchronous demodulation. The digital results of the foregoing demodulation procedures conventionally have 8-bit accuracy or more and describe 2N-level symbols that encode N bits of data. Currently, 2N is eight in the case where the FIG. 1 DTV signal receiver receives a through-the-air broadcast via the antenna 12 and is sixteen in the case where the FIG. 1 DTV signal receiver receives cablecast. The concern of the invention is with the reception of terrestrial through-the-air broadcasts, and FIG. 1 does not show the portions of the DTV signal receiver providing symbol decoding and error-correction decoding for received cablecast transmissions.

Symbol synchronization and equalization circuitry 16 receives at least the digitized real samples of the in-phase (I-channel) baseband signal from the complex demodulator 14; in the FIG. 1 DTV signal receiver the circuitry 16 is shown also receiving the digitized imaginary samples of the quadrature-phase (Q-channel) baseband signal. The circuitry 16 includes a digital filter with adjustable weighting coefficients that compensates for ghosts and tilt in the received signal. The symbol synchronization and equalization circuitry 16 provides symbol synchronization or "de-rotation" as well as amplitude equalization and ghost removal. Symbol synchronization and equalization circuitry in which symbol synchronization is accomplished before amplitude equalization is known from U.S. Pat. No. 5,479,449. In such designs the demodulator 14 will supply oversampled demodulator response containing real and imaginary baseband signals to the symbol synchronization and equalization circuitry 16. After symbol synchronization, the oversampled data are decimated to extract baseband I-channel signal at normal symbol rate, to reduce sample rate through the digital filtering used for amplitude equalization and ghost removal. Symbol synchronization and equalization circuitry in which amplitude equalization precedes symbol synchronization, "de-rotation" or "phase tracking" is also known to those skilled in the art of digital signal receiver design.

Each sample of the circuitry 16 output signal is resolved to ten or more bits and is, in effect, a digital description of an analog symbol exhibiting one of (2N=8) levels. The circuitry 16 output signal is carefully gain-controlled by any one of several known methods, so the ideal step levels for symbols are known. One method of gain control, preferred because the speed of response of such gain control is exceptionally rapid, regulates the direct component of the real baseband signal supplied from the complex demodulator 14 to a normalized level of +1.25. This method of gain control is generally described in U.S. Pat. No. 5,479,449 and is more specifically described by C. B. Patel et alii in U.S. Pat. No. 5,573,454 issued Jun. 3, 1997, entitled "AUTOMATIC GAIN CONTROL OF RADIO RECEIVER FOR RECEIVING DIGITAL HIGH-DEFINITION TELEVISION SIGNALS", and incorporated herein by reference.

The output signal from the circuitry 16 is supplied as input signal to data sync detection circuitry 18, which recovers data field synchronization information F and data segment synchronization information S from the equalized baseband I-channel signal. Alternatively, the input signal to data sync detection circuitry 18 can be obtained prior to equalization.

The equalized I-channel signal samples at normal symbol rate supplied as output signal from the circuitry 16 are applied as the input signal to an NTSC-rejection comb filter 20. The comb filter 20 includes a first delay device 201 to generate a pair of differentially delayed streams of the 2N-level symbols and a first linear combiner 202 for linearly combining the differentially delayed symbol streams to generate the comb filter 20 response. As described in U.S. Pat. No. 5,260,793, the first delay device 201 can provide a delay equal to the period of twelve 2N-level symbols, and the first linear combiner 202 can be a subtractor. Each sample of the comb filter 20 output signal is resolved to ten or more bits and is, in effect, a digital description of an analog symbol exhibiting one of (4N−1)=15 levels.

The symbol synchronization and equalization circuitry 16 is presumed be designed to suppress the direct bias component of its input signal (as expressed in digital samples), which direct bias component has a normalized level of +1.25 and appears in the real baseband signal supplied from the complex demodulator 14 owing to detection of the pilot carrier. Accordingly, each sample of the circuitry 16 output signal applied as comb filter 20 input signal is, in effect, a digital description of an analog symbol exhibiting one of the following normalized levels: −7, −5, −3, −1, +1, +3, +5 and +7. These symbol levels are denominated as "odd" symbol levels and are detected by an odd-level data-slicer 22 to generate interim symbol decoding results of 000, 001, 010, 011, 100, 101, 110 and 111, respectively.

Each sample of the comb filter 20 output signal is, in effect, a digital description of an analog symbol exhibiting one of the following normalized levels: −14, −12, −10, −8, −6, −4, −2, 0, +2, +4, +6, +8, +10, +12 and +14. These symbol levels are denominated as "even" symbol levels and are detected by an even-level data-slicer 24 to generate precoded symbol decoding results of 001, 010, 011, 100, 101, 110, 111, 000, 001, 010, 011, 100, 101, 110, and 111, respectively.

The data-slicers 22 and 24 can be of the so-called "hard decision" type, as presumed up to this point in the description, or can be of the so-called "soft decision" type used in implementing a Viterbi decoding scheme. Arrangements are possible in which the odd-level data-slicer 22 and the even-level data-slicer 24 are replaced by a single data-slicer, using multiplexer connections to shift its place in circuit and to provide bias to modify its slicing ranges, but these arrangements are not preferred because of the complexity of operation.

The symbol synchronization and equalization circuitry 16 is presumed in the foregoing description to be designed to suppress the direct bias component of its input signal (as expressed in digital samples), which direct bias component has a normalized level of +1.25 and appears in the real baseband signal supplied from the complex demodulator 14 owing to detection of the pilot carrier. Alternatively, the symbol synchronization and equalization circuitry 16 is designed to preserve the direct bias component of its input signal, which simplifies the design of the equalization filter in the circuitry 16 somewhat. In such case the data-slicing levels in the odd-level data-slicer 22 are offset to take into account the direct bias component accompanying the data steps in its input signal. Providing that the first linear combiner 202 is a subtractor, whether the circuitry 16 is designed to suppress or to preserve the direct bias component of its input signal has no consequence in regard to the data-slicing levels in the even-level data-slicer 24. However, if the differential delay provided by the first delay device 201 is chosen so that the first linear combiner 202 is an adder, the data-slicing levels in the even-level data-slicer 24 should be offset to take into account the doubled direct bias component accompanying the data steps in its input signal.

A comb filter 26 is used after the data-slicers 22 and 24 to generate a postcoding filter response to the precoding filter response of the comb filter 20. The comb filter 26 includes a 3-input multiplexer 261, a second linear combiner 262, and a second delay device 263 with delay equal to that of the first delay device 201 in the comb filter 20. The second linear combiner 262 is a modulo-8 adder if the first linear combiner 202 is a subtractor and is a modulo-8 subtractor if the first linear combiner 202 is an adder. The first linear combiner 202 and the second linear combiner 262 may be constructed as respective read-only memories (ROMs) to speed up linear combination operations sufficiently to support the sample rates involved. The output signal from the multiplexer 261 furnishes the response from the postcoding comb filter 26 and is delayed by the second delay device 263. The second linear combiner 262 combines precoded symbol decoding results from the even-level data-slicer 24 with the output signal from the second delay device 263.

The output signal of the multiplexer 261 reproduces one of the three input signals applied to the multiplexer 261, as selected in response to first, second and third states of a multiplexer control signal supplied to the multiplexer 261 from a controller 28. The first input port of the multiplexer 261 receives ideal symbol decoding results supplied from memory within the controller 28 during times when data field synchronization information F and data segment synchronization information S from the equalized baseband I-channel signal are recovered by the data sync detection circuitry 18. The controller 28 supplies the first state of the multiplexer control signal to the multiplexer 261 during these times, conditioning the multiplexer 261 to furnish, as the final coding results which are its output signal, the ideal symbol decoding results supplied from memory within the controller 28. The odd-level data-slicer 22 supplies interim symbol decoding results as its output signal to the second input port of the multiplexer 261. The multiplexer 261 is conditioned by the second state of the multiplexer control signal to reproduce the interim symbol decoding results in the final coding results supplied from the multiplexer 261. The second linear combiner 262 supplies postcoded symbol decoding results as its output signal to the third input port of the multiplexer 261. The multiplexer 261 is conditioned by the third state of the multiplexer control signal to reproduce the postcoded symbol decoding results for example. Running errors in the postcoded symbol decoding results from the postcoding comb filter 26 are curtailed by feeding back the ideal symbol decoding results supplied from memory within the controller 28 during times data sync detection circuitry 18 recovers data field synchronization information F and data segment synchronization information S.

The output signal from the multiplexer 261 in the postcoding comb filter 26 comprises the final symbol decoding results in 3-parallel-bit groups, assembled by a data assembler 30 for application to a data interleaver 32. The data interleaver 32 commutates the assembled data into parallel data streams for application to trellis decoder circuitry 34. Trellis decoder circuitry 34 conventionally uses twelve trellis decoders. The trellis decoding results are supplied from the trellis decoder circuitry 34 to data de-interleaver circuitry 36 for de-commutation. Byte parsing circuitry 38 converts the data interleaver 36 output signal into bytes of Reed-Solomon error-correction coding for application to Reed-Solomon decoder circuitry 40, which performs Reed-Solomon decoding to generate an error-corrected byte stream supplied to a data de-randomizer 42. The data de-randomizer 42 supplies reproduced data to the remainder of the receiver (not shown). The remainder of a complete DTV signal receiver will include a packet sorter, an audio decoder, an MPEG-2 decoder and so forth. The remainder of a DTV signal receiver incorporated in a digital tape recorder/reproducer will include circuitry for converting the data to a form for recording.

An NTSC co-channel interference detector 44 supplies the controller 28 with an indication of whether NTSC co-channel interference is of sufficient strength as to cause uncorrectable error in the data-slicing performed by the data-slicer 22. If detector 44 indicates the NTSC co-channel interference is not of such strength, the controller 28 will supply the second state of multiplexer control signal to the multiplexer 261 at times other than those times when data field synchronization information F and data segment synchronization information S are recovered by the data sync detection circuitry 18. This conditions the multiplexer 261 to reproduce as its output signal the interim symbol decoding results supplied from the odd-level data-slicer 22. If detector 44 indicates the NTSC co-channel interference is of sufficient strength to cause uncorrectable error in the data-slicing performed by the data-slicer 22, the controller 28 will supply the third state of multiplexer control signal to the multiplexer 261 at times other than those times when data field synchronization information F and data segment synchronization information S are recovered by the data sync detection circuitry 18. This conditions the multiplexer 261 to reproduce as its output signal the postcoded symbol decoding results provided as second linear combining results from the second linear combiner 262.

The invention disclosed in this specification and its accompanying drawing is characterized by the NTSC co-channel interference detector 44 responding to the artifacts of NTSC co-channel interference that appear in the Q-channel output signal of the complex demodulator 14 for DTV signal. The detector 44 can be connected to detect the artifacts of NTSC co-channel interference in Q-channel output signal from the complex demodulator 14 extracted before the symbol synchronization and equalization circuitry 16, but FIG. 1 shows the detector 44 connected to detect the artifacts in Q-channel output signal extracted from the response of the symbol synchronization and equalization circuitry 16.

Figure 2:
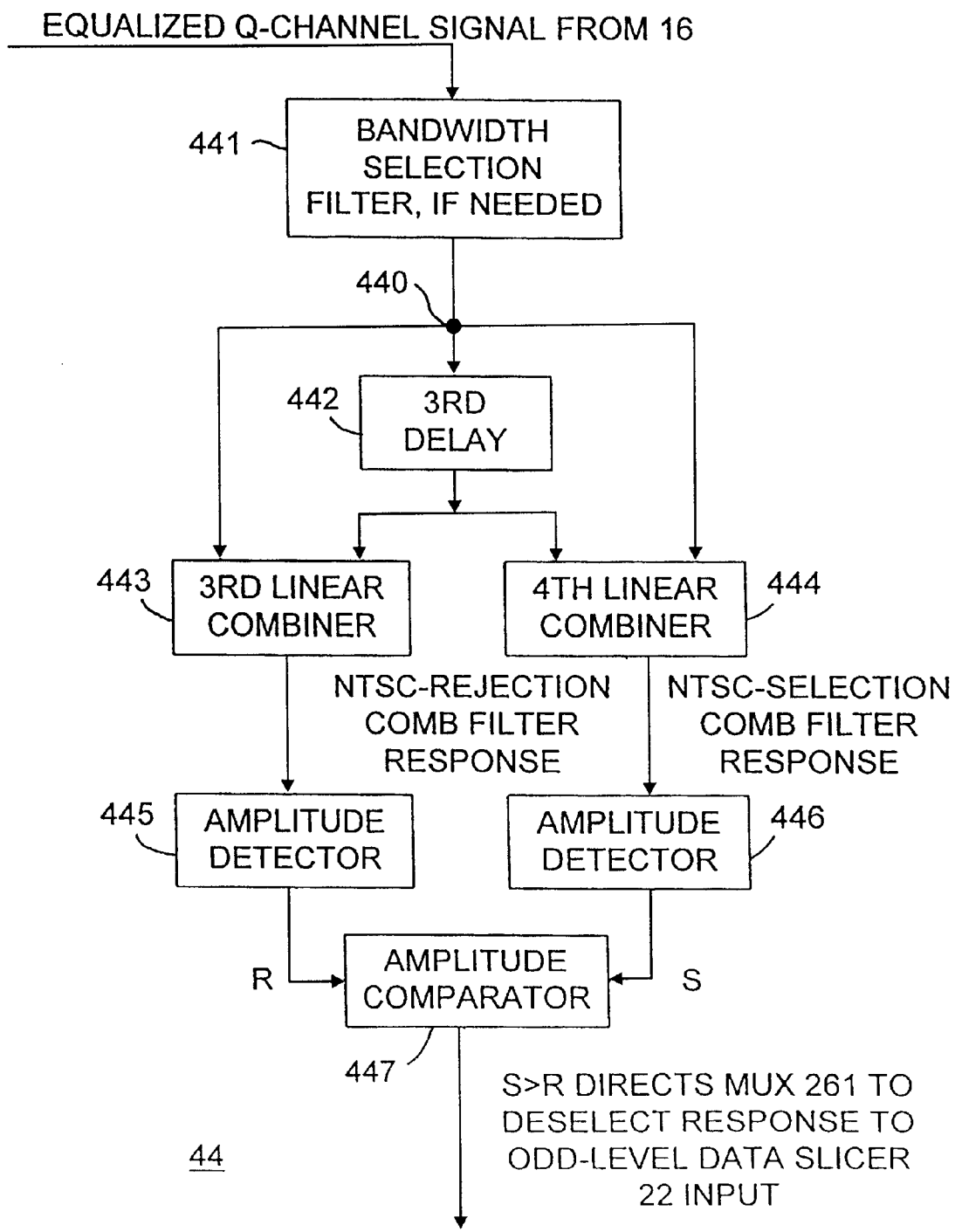
FIG. 2 is a block diagram of an NTSC co-channel interference detector constructed in accordance with the invention to respond to the Q-channel signal from a complex demodulator for DTV signal.

FIG. 2 shows a form the NTSC co-channel interference detector 44 can take in one embodiment of the invention. The Q-channel output signal extracted from the response of the symbol synchronization and equalization circuitry 16 is supplied to a node 440, either directly or after filtering by a bandwidth selection filter 441 that supplies to the node 440 a response to those portions of Q-channel output signal more likely to contain artifacts of NTSC co-channel interference. The signal at node 440 is applied as input signal to a third delay device 442 to be subjected to a third delay. A third linear combiner 443 linearly combines the signal at node 440 with that signal as delayed by the third delay device 442 to generate a comb filter response in which artifacts of NTSC co-channel interference are rejected. A fourth linear combiner 444 linearly combines the signal at node 440 with that signal as delayed by the third delay device 442 to generate a comb filter response in which artifacts of NTSC co-channel interference are selected. One of the third and fourth linear combiners is a digital adder and the other is a digital subtractor, the choice of which is which depending on the delay by the third delay device 442 is designed to provide. The amplitude of the comb filter response from the third linear combiner 443 is detected by an amplitude detector 445, the amplitude of the comb filter response from the fourth linear combiner 444 is detected by an amplitude detector 446, and the results of amplitude detection by the amplitude detectors 445 and 446 are compared by an amplitude comparator 447. The amplitude comparator 447 supplies an output bit indicative of whether or not the response of the amplitude detector 446 substantially exceeds the response of the amplitude detector 445. This output bit is used for selecting between the second and third states of multiplexer 261 operation. For example, this output bit from the amplitude comparator 447 can be one of two control bits the controller 28 supplies to the multiplexer 261 in the postcoding comb filter 26 of the FIG. 1, the other control bit being indicative of whether or not signal supplied from the controller 28 is to be reproduced in the multiplexer 261 response.

The amplitude detectors 445 and 446 can, by way of example, be envelope detectors with a time constant equal to several data sample intervals, so that differences in the data components of their input signals tend to average out to low value supposing them to be random. Differences in random noise accompanying the responses of the linear combiners 443 and 444 tend to average out to zero as well. Accordingly, when the amplitude comparator 447 for comparing the amplitude detection responses of amplitude detectors 445 and 446 indicates those responses differ more than a prescribed amount, this is indicative that artifacts of any co-channel interfering analog television signal are above a significant level for the Q-channel baseband signal. This significant level for the Q-channel baseband signal corresponds to the significant level for the I-channel baseband signal. Errors in symbol decoding done by simply data slicing the I-channel baseband signal are correctable by the trellis and Reed-Solomon error-correction coding as long as artifacts of any co-channel interfering analog television signal are kept below the significant level for the I-channel baseband signal.

When the amplitude of the comb filter response from the fourth linear combiner 444 in which artifacts of NTSC co-channel interference are selected is substantially larger than the amplitude of the comb filter response from the third linear combiner 443 in which artifacts of NTSC co-channel interference are rejected, this difference can then be presumed to be caused by the presence of artifacts of NTSC co-channel interference in the signal at node 440. The output bit supplied by the amplitude comparator 447 for this condition conditions the multiplexer 261 not to be operable in its second state, thereby deselecting the interim symbol decoding results from the odd-level data slicer 22 from appearing as final symbol decoding results from the multiplexer 261.

When the amplitude of the comb filter response from the fourth linear combiner 444 in which artifacts of NTSC co-channel interference are selected is not substantially larger than the amplitude of the comb filter response from the third linear combiner 443 in which artifacts of NTSC co-channel interference are rejected, this lack of difference can be presumed to indicate the absence of artifacts of NTSC co-channel interference in the signal at node 440. The output bit supplied by the amplitude comparator 447 for this condition conditions the multiplexer 261 not to be operable in its third state, thereby deselecting the postcoded symbol decoding results from the second linear combiner 262 from appearing as final symbol decoding results from the multiplexer 261.

The inclusion of the bandwidth selection filter 441 may be unnecessary or even undesirable, depending on the length of delay in the third delay element 442 and on the design of the amplitude detectors 445 and 446. Instead of being envelope detectors, the amplitude detectors 445 and 446 may detect the energy of departures of their input signals from symbol code levels as inferred from pilot carrier strength; the bandwidth selection filter 441 would not be used in such case. If the length of delay in the third delay element 442 is such that artifacts of the NTSC sound carrier tend not to cancel very well, but the artifacts of the NTSC video carrier and color subcarrier tend to cancel reasonably well, and if the amplitude detectors 445 and 446 are envelope detectors, then the bandwidth selection filter 441 can take the form of a finite-impulse-response (FIR) digital lowpass filter 4410 with a cut-off frequency no higher than about 5.4 MHz, as shown in FIGS. 7, 9, 11, 13 and 14.

Figure 3:
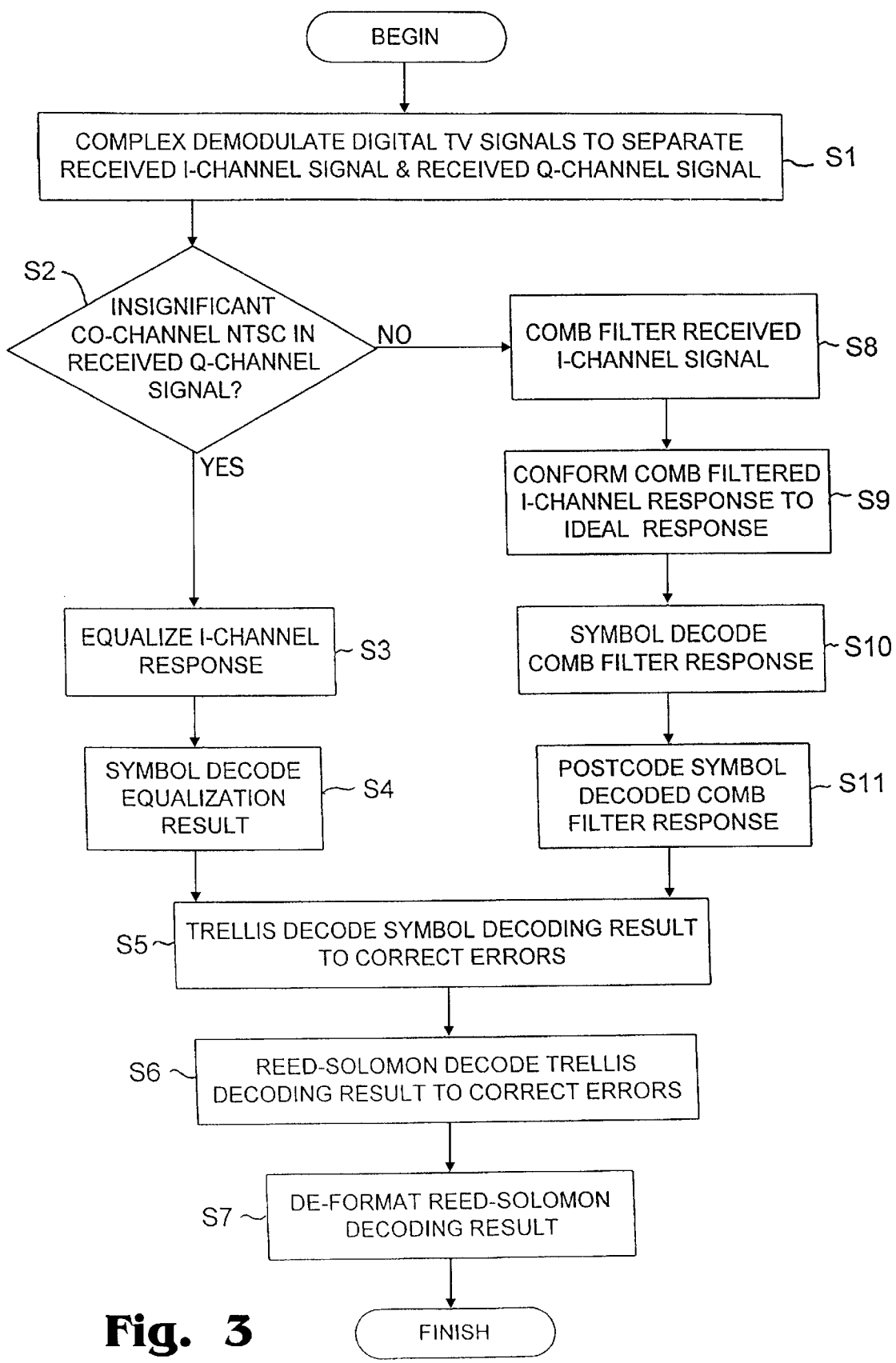
FIG. 3 is a flow chart of operation in a portion of the FIG. 1 digital television receiver showing how equalization procedures are modified depending on whether or not comb filtering to suppress co-channel NTSC interference is employed.

FIG. 3 is a flow chart showing how equalization procedures are modified in the FIG. 1 DTV signal receiver depending on whether or not comb filtering to suppress co-channel NTSC interference is employed. The inventor points out that the presence of the artifacts of co-channel NTSC interference in the baseband symbol coding introduces errors into the calculation of equalization filter kernel coefficients unless special measures are taken in the calculations to negate these artifacts.

In an initial step S1, a complex demodulation of digital television signals is continuously performed by the complex demodulator 14 in the FIG. 1 DTV signal receiver, to separate a received I-channel baseband signal and a received Q-channel baseband signal in an orthogonal relationship with the received I-channel baseband signal. In a decision step S2, which is also continuously performed by the NTSC co-channel interference detector 44 in the FIG. 1 DTV signal receiver, it is determined whether or not a significant amount of co-channel NTSC interference accompanies the received Q-channel baseband signal.

A significant amount of co-channel NTSC interference in a DTV signal receiver is that level which causes the number of errors incurred during trellis decoding to significantly degrade the error correcting capabilities of the two-dimensional Reed-Solomon decoding that follows trellis decoding, causing substantial numbers of bit errors in the ultimately recovered data, under conditions of normally noisy reception. The significant amount of co-channel NTSC interference in a DTV signal receiver of particular design is readily determined by experiments on a prototype thereof.

If in the decision step S2 no significant amount of co-channel NTSC interference is determined to accompany the received Q-channel baseband signal, a step S3 of adjusting the kernel weights of a digital equalization filter, in order to equalize its response to the I-channel baseband signal, and a subsequent step S4 of symbol decoding the equalization filter response resulting from the step S3 are performed to generate symbol decoding result used in a step S5 of trellis decoding the symbol decoding result to correct errors therein. The step S5 of trellis decoding is followed by a step S6 of Reed-Solomon decoding to correct errors in the result of trellis decoding and a step S7 of deformatting the result of Reed-Solomon decoding.

If in the decision step S2 a significant amount of co-channel NTSC interference is determined to accompany the received Q-channel baseband signal, a step S8 of comb filtering the received I-channel baseband signal to generate comb-filtered I-channel baseband signal is performed using a suitable comb filter. In a step S9 the kernel weights of the digital equalization filter are adjusted to conform the response of the cascaded digital equalization filter and comb filter to an ideal response for such filter cascade. A step S10 of symbol decoding the response of such filter cascade is performed and thereafter a step 11 of postcoding the symbol decoding response is performed to obtain corrected symbol decoding result to be used in the step S5 of trellis decoding. The step S5 of trellis decoding is still followed by the step S6 of Reed-Solomon decoding to correct errors in the result of trellis decoding and the step S7 of deformatting the result of Reed-Solomon decoding.

The submethod used for adjusting the kernel weights of the digital equalization filter in step S3 of equalizing digital equalization filter response is similar to the adjustment of the kernel weights of the digital equalization filter used in the prior art. Adjustment can be made by calculating the discrete Fourier transform (DFT) of the received data field synchronization code or a prescribed portion thereof and dividing it by the DFT of the ideal data field synchronization code or prescribed portion thereof to determine the DFT of the DTV transmission channel. The DFT of the DTV transmission channel is normalized with respect to the largest term(s) to characterize the channel, and the kernel weights of the digital equalization filter are selected to complement the normalized DFT characterizing the channel. This method of adjustment is described in greater detail by C. B. Patel et alii in U.S. Pat. No. 5,331,416 issued Jul. 19, 1994 and entitled "METHODS FOR OPERATING GHOST-CANCELATION CIRCUITRY FOR TV RECEIVER OR VIDEO RECORDER", for example. This method is preferable for initial adjustment of the kernel weights of the digital equalization filter because the initial adjustment is more rapidly made than by using adaptive equalization. After initial adjustment of the kernel weights of the digital equalization filter, adaptive equalization methods are preferred. A block LMS method for carrying out adaptive equalization is described by J. Yang et alii in U.S. Pat. No. 5,648,987 issued Jul. 15, 1997 and entitled "RAPID-UPDATE ADAPTIVE CHANNEL-EQUALIZATION FILTERING FOR DIGITAL RADIO RECEIVERS, SUCH AS HDTV RECEIVERS". A continuous LMS method for carrying out adaptive equalization is described by A. L. R. Limberg in U. S. patent application Ser. No. 08/832,674 filed Apr. 4, 1997 and entitled "DYNAMICALLY ADAPTIVE EQUALIZER SYSTEM AND METHOD".

In the step S9 the submethod by which the kernel weights of the digital equalization filter are adjusted to conform the response of the cascaded digital equalization filter and comb filter to an ideal response for such filter cascade can be carried out using DFT, especially when performing rapid initial equalization prior to switching to adaptive equalization. Adjustment is made by calculating the discrete Fourier transform (DFT) of the received data field synchronization code or a prescribed portion thereof, as comb filtered by the comb filter 20 for rejecting NTSC artifacts and dividing it by the DFT of the ideal data field synchronization code or prescribed portion thereof, as so comb filtered, to determine the DFT of the DTV transmission channel. The DFT of the DTV transmission channel is then normalized with respect to the largest term(s) to characterize the channel, and the kernel weights of the digital equalization filter are adjusted to complement the normalized DFT characterizing the channel. After initial adjustment of the kernel weights of the digital equalization filter, adaptive equalization methods are preferably employed. These adaptive equalization methods differ from those used when artifacts of NTSC co-channel interference are insignificant in that the number of possible valid signal states is doubled, less one, by using the comb filter 20 for rejecting NTSC artifacts.

Figure 4:
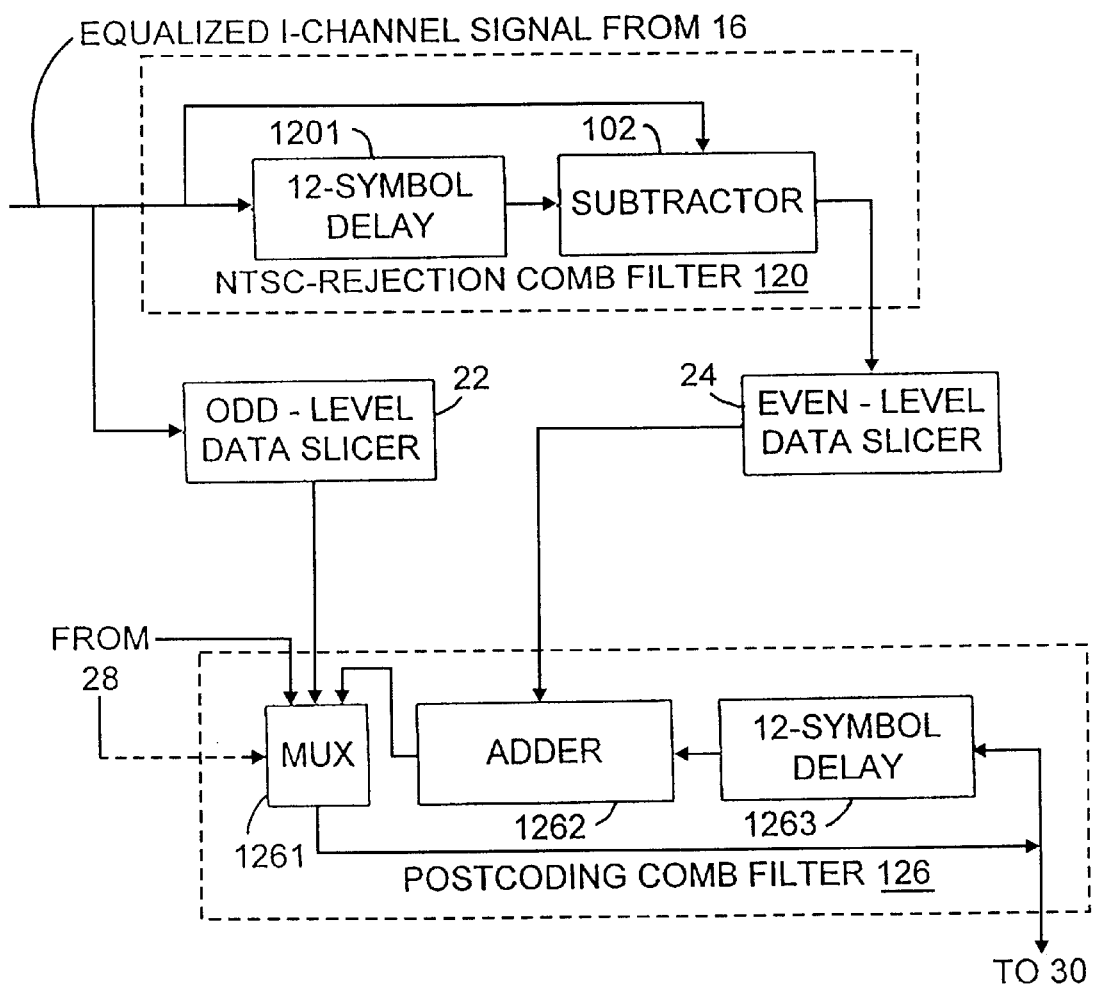
FIG. 4 is a block schematic diagram showing details of a portion of the FIG. 1 digital television signal receiver when the NTSC-rejection comb filter employs a 12-symbol delay.

FIG. 4 is a block schematic diagram showing details of a portion of the FIG. 1 DTV signal receiver using a species 120 of the NTSC-rejection comb filter 20 and a species 126 of the postcoding comb filter 26. A subtractor 1202 serves as the first linear combiner in the NTSC-rejection comb filter 120, and a modulo-8 adder 1262 serves as the second linear combiner in the postcoding comb filter 126. The NTSC-rejection comb filter 120 uses a first delay device 1201 exhibiting a delay of twelve symbol epochs, and the postcoding comb filter 126 uses a second delay device 1263 also exhibiting a delay of twelve symbol epochs. The 12-symbol delay exhibited by each of the delay devices 1201 and 1263 is close to one cycle delay of the artifact of the analog TV video carrier at 59.75 times the analog TV horizontal scan frequency $f_H$. The 12-symbol delay is close to five cycles of the artifact of the analog TV chrominance subcarrier at 287.25 times $f_H$. The 12-symbol delay is close to six cycles of the artifact of the analog TV sound carrier at 345.75 times $f_H$. This is the reason that the differentially combined response of the subtractor 1202 to the audio carrier, to the video carrier and to frequencies close to chrominance subcarrier differentially delayed by the first delay device 1201 tends to have reduced co-channel interference. However, in portions of a video signal in which edges cross a horizontal scan line, the amount of correlation in the analog TV video signal at such distances in the horizontal spatial direction is quite low.

A species 1261 of the multiplexer 261 is controlled by a multiplexer control signal that is in its second state most of the time when it is determined there is insufficient NTSC co-channel interference to cause uncorrectable error in the output signal from the data-slicer 22 and that is in its third state most of the time when it is determined there is sufficient NTSC co-channel interference to cause uncorrectable error in the output signal from the data-slicer 22. The multiplexer 1261 is conditioned by its control signal being in its third state to feed back the modulo-8 sum results of the adder 1262, as delayed twelve symbol epochs by the delay device 1263, to the adder 1262 as a summand. This is a modular accumulation procedure in which a single error propagates as a running error, with error recurring every twelve symbol epochs. Running errors in the postcoded symbol decoding results from the postcoding comb filter 126 are curtailed by the multiplexer 1261 being placed into its first state for four symbol epochs at the beginning of each data segment, as well as during the entirety of each data segment containing field sync. When this control signal is in its first state, the multiplexer 1261 reproduces as its output signal ideal symbol decoding results supplied from memory in the controller 28. The introduction of ideal symbol decoding results into the multiplexer 1261 output signal halts a running error. Since there are 4+69(12) symbols per data segment, the ideal symbol decoding results slip back four symbol epochs in phase each data segment, so no running error can persist for longer than three data segments.

Figure 5:
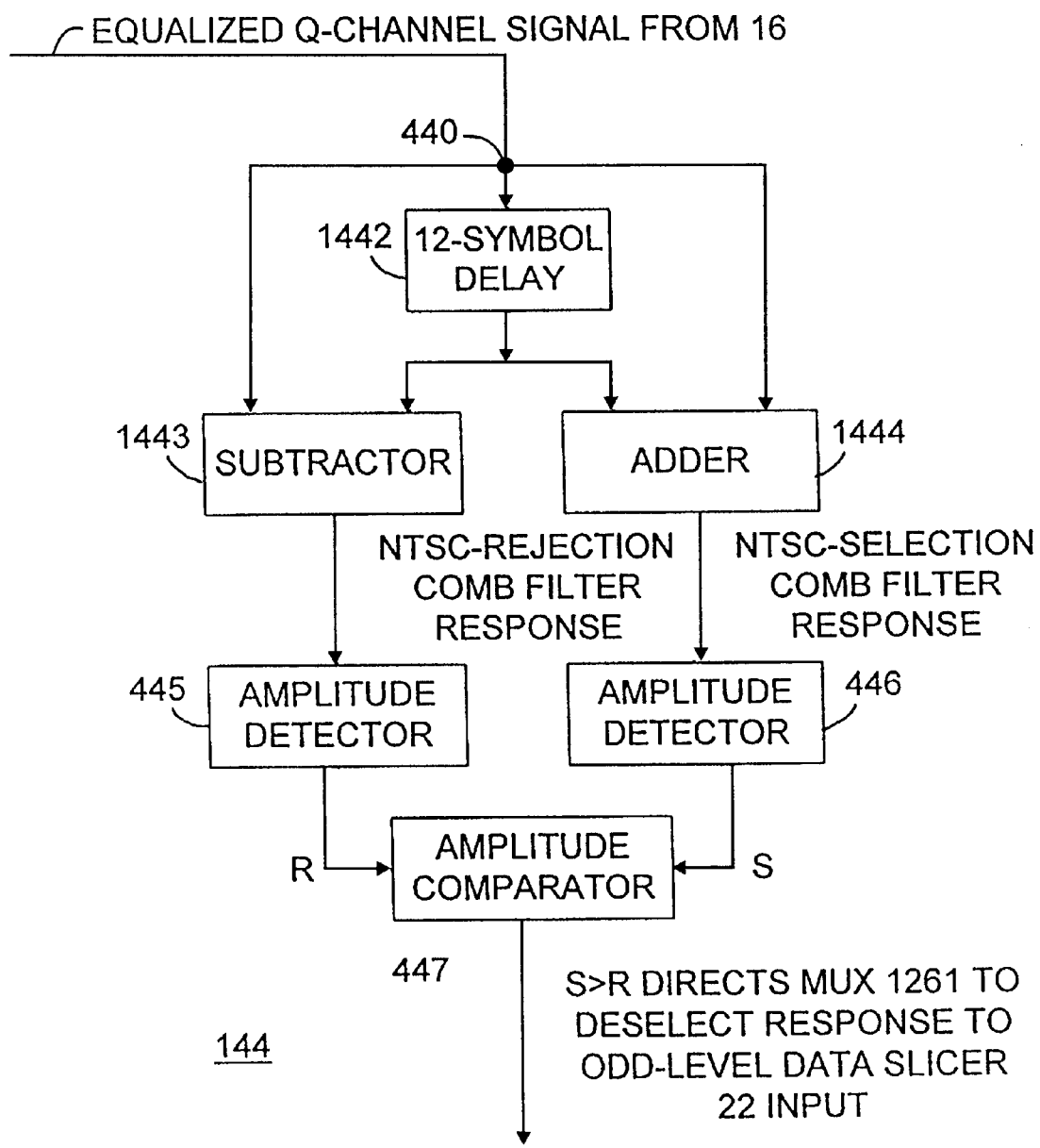
FIG. 5 is a block schematic diagram showing details of the FIG. 2 NTSC co-channel interference detector when a 12-symbol delay is employed therewithin.

FIG. 5 is a block schematic diagram showing details of a species 144 of the FIG. 2 NTSC co-channel interference detector 44 with a third delay element 1442 therewithin providing a 12-symbol delay of Q-channel signal from the symbol synchronization and equalization circuitry 16 applied directly to the node 440. The third linear combiner is a digital subtractor 1443 differentially combining differentially-delayed Q-channel signal from the symbol synchronization and equalization circuitry 16 to generate the comb filter response supplied to the amplitude detector 445 in which response artifacts of NTSC co-channel interference are rejected. The fourth linear combiner is a digital adder 1444 additively combining the differentially-delayed Q-channel signal to generate the comb filter response supplied to the amplitude detector 445 in which response artifacts of NTSC co-channel interference are selected. This NTSC co-channel interference detector 144 is especially well suited for use in the FIG. 1 DTV signal receiver when it uses the species 120 of the NTSC-rejection comb filter 20 and the species 126 of the postcoding comb filter 26. Since the comb filtering employing the subtractor 1443 rejects artifacts arising from NTSC audio carrier, from NTSC video carrier and from NTSC color subcarrier the bandwidth selection filter 441 is unnecessary before the node 440.

Figure 6:
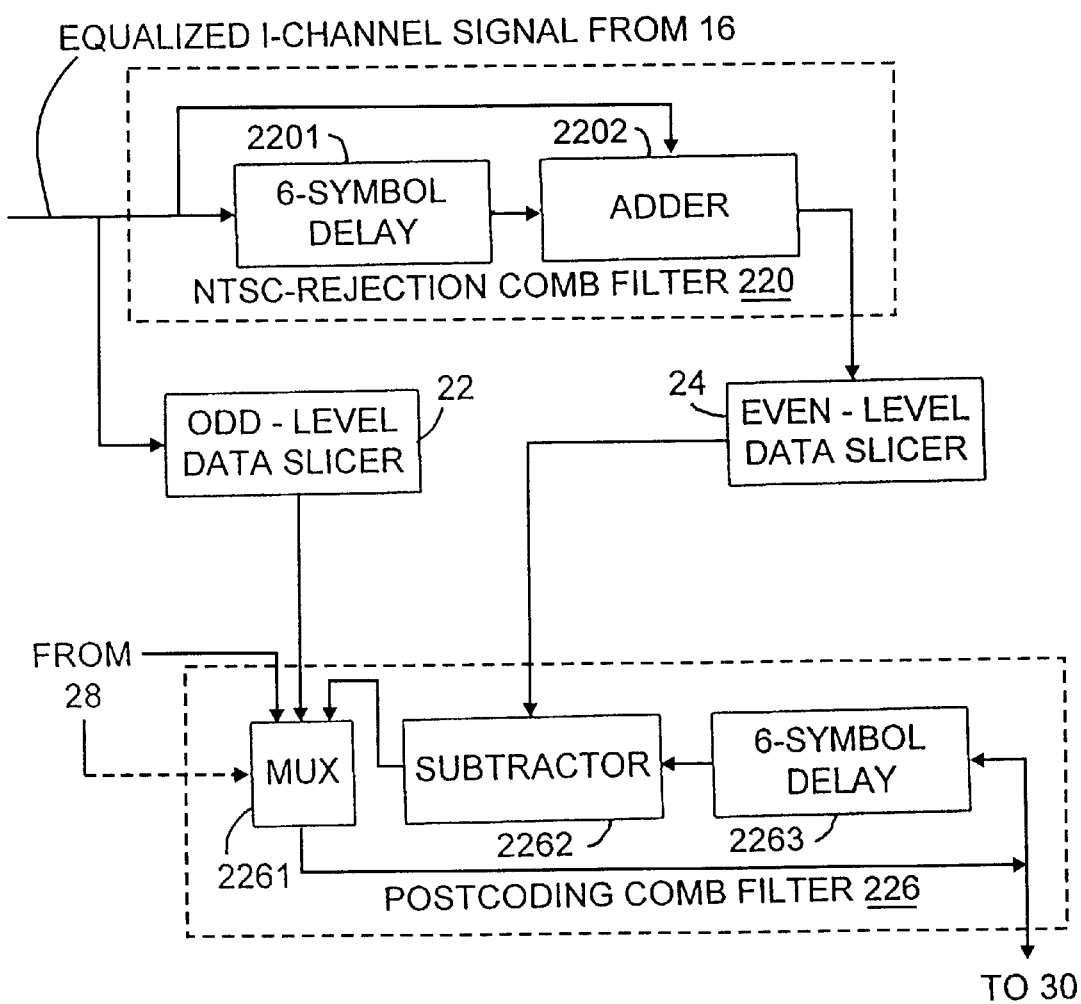
FIG. 6 is a block schematic diagram showing details of a portion of the FIG. 1 DTV signal receiver when the NTSC-rejection comb filter employs a 6-symbol delay.

FIG. 6 is a block schematic diagram showing details of a portion of the FIG. 1 DTV signal receiver using a species 220 of the NTSC-rejection comb filter 20 and a species 226 of the postcoding comb filter 26. The NTSC-rejection comb filter 220 uses a first delay device 2201 exhibiting a delay of six symbol epochs, and the postcoding comb filter 226 uses a second delay device 2263 also exhibiting a delay of six symbol epochs. The 6-symbol delay exhibited by each of the delay devices 2201 and 2263 is close to 0.5 cycle delay of the artifact of the analog TV video carrier at 59.75 times the analog TV horizontal scan frequency $f_H$, close to 2.5 cycles of the artifact of the analog TV chrominance subcarrier at 287.25 times $f_H$, and close to 3 cycles of any artifact of the analog TV audio carrier at 345.75 times $f_H$. An adder 2202 serves as the first linear combiner in the NTSC-rejection comb filter 220, and a modulo-8 subtractor 2262 serves as the second linear combiner in the postcoding comb filter 226. Since the delay exhibited by the delay devices 2201 and 2263 is shorter than the delay exhibited by the delay devices 1201 and 1263, although nulls near frequencies converted from analog TV carrier frequencies are narrower band, there is more likely to be good anti-correlation in the signals additively combined by the adder 2202 than there is likely to be good correlation in the signals differentially combined by the subtractor 1202. The suppression of the sound carrier is poorer in the NTSC-rejection comb filter 220 response than in the NTSC-rejection comb filter 120 response. However, if the sound carrier of a co-channel interfering analog TV signal has been suppressed by SAW filtering or a sound trap in the IF amplifier chain 12, the poor sound rejection of the comb filter 220 is not a problem. The responses to sync tips is reduced in duration using the NTSC-rejection comb filter 220 of FIG. 6 rather than the NTSC-rejection comb filter 120 of FIG. 4, so there is substantially reduced tendency to overwhelm error-correction in the trellis decoding and Reed-Solomon coding.

A species 2261 of the multiplexer 261 is controlled by a multiplexer control signal that is in its second state most of the time when it is determined there is insufficient NTSC co-channel interference to cause uncorrectable error in the output signal from the data-slicer 22 and that is in its third state most of the time when it is determined there is sufficient NTSC co-channel interference to cause uncorrectable error in the output signal from the data-slicer 22. The multiplexer 2261 is conditioned by its control signal being in its third state to feed back the modulo-8 sum results of the adder 2262, as delayed six symbol epochs by the delay device 2263, to the adder 2262 as a summand. This is a modular accumulation procedure in which a single error propagates as a running error, with error recurring every six symbol epochs. Running errors in the postcoded symbol decoding results from the postcoding comb filter 226 are curtailed by the multiplexer 2261 being placed into its first state for four symbol epochs at the beginning of each data segment, as well as during the entirety of each data segment containing field sync. When this control signal is in its first state, the multiplexer 2261 reproduces as its output signal ideal symbol decoding results supplied from memory in the controller 28. The introduction of ideal symbol decoding results into the multiplexer 2261 output signal halts a running error. Since there are 4+138(6) symbols per data segment, the ideal symbol decoding results slip back four symbol epochs in phase each data segment, so no running error can persist for longer than two data segments. The likelihood of a protracted period of running error in the postcoding comb filter 226 is substantially less than in the postcoding comb filter 126, although the running error recurs more frequently and affects twice as many of the twelve interleaved trellis codes.

Figure 7:
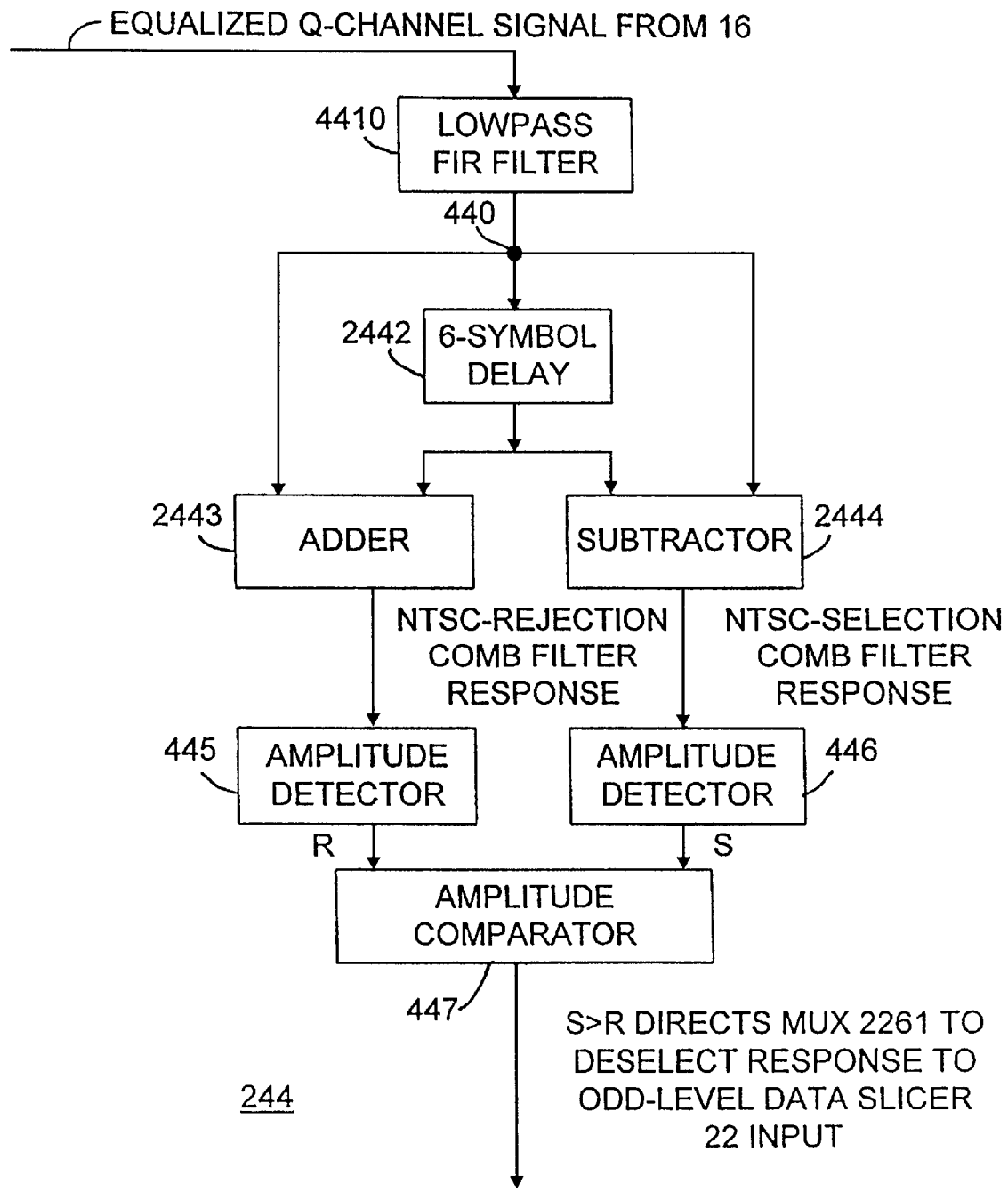
FIG. 7 is a block schematic diagram showing details of the FIG. 2 NTSC co-channel interference detector when a 6-symbol delay is employed therewithin.

FIG. 7 is a block schematic diagram showing details of a species 244 of the FIG. 2 NTSC co-channel interference detector 44 with a third delay element 2442 therewithin providing a 6-symbol delay to Q-channel signal applied to the node 440. The third linear combiner is a digital adder 2443 additively combining the differentially-delayed Q-channel signal to generate the comb filter response supplied to the amplitude detector 445 in which response artifacts of NTSC co-channel interference are rejected. The fourth linear combiner is a digital subtractor 2444 differentially combining differentially-delayed Q-channel signal from the symbol synchronization and equalization circuitry 16 to generate the comb filter response supplied to the amplitude detector 446 in which response artifacts of NTSC co-channel interference are selected. This NTSC co-channel interference detector 244 is especially well suited for use in the FIG. 1 DTV signal receiver when it uses the species 220 of the NTSC-rejection comb filter 20 and the species 226 of the postcoding comb filter 26.

Figure 8:
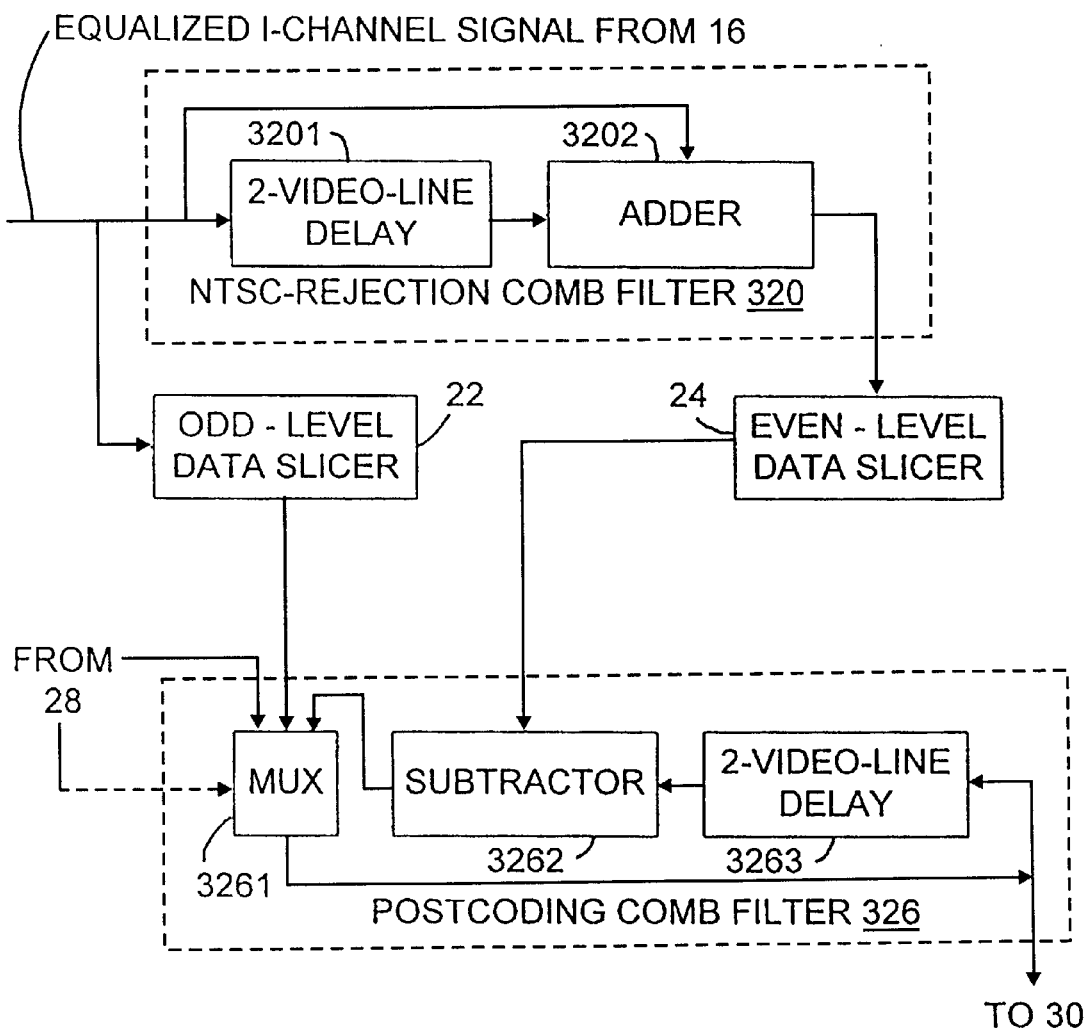
FIG. 8 is a block schematic diagram showing details of a portion of the FIG. 1 DTV signal receiver when the NTSC-rejection comb filter employs a 2-video-line delay.

FIG. 8 is a block schematic diagram showing details of a portion of the FIG. 1 DTV signal receiver using a species 320 of the NTSC-rejection comb filter 20 and a species 326 of the postcoding comb filter 26. The NTSC-rejection comb filter 320 uses a first delay device 3201 exhibiting a delay of 1368 symbol epochs, which delay is substantially equal to the epoch of two horizontal scan lines of an analog TV signal, and the postcoding comb filter 326 uses a second delay device 3263 also exhibiting such delay. The first linear combiner in the NTSC-rejection comb filter 320 is an adder 3202, and the second linear combiner in the postcoding comb filter 326 is a modulo-8 subtractor 3262.

A species 3261 of the multiplexer 261 is controlled by a multiplexer control signal that is in its second state most of the time when it is determined there is insufficient NTSC co-channel interference to cause uncorrectable error in the output signal from the data-slicer 22 and that is in its third state most of the time when it is determined there is sufficient NTSC co-channel interference to cause uncorrectable error in the output signal from the data-slicer 22. The DTV signal receiver preferably contains circuitry for detecting change between alternate scan lines in the NTSC co-channel interference, so that the controller 28 can withhold supplying the third state of the multiplexer 3261 control signal under such conditions.

The multiplexer 3261 is conditioned by its control signal being in its third state to feed back the modulo-8 sum results of the adder 3262, as delayed 1368 symbol epochs by the delay device 3263, to the adder 3262 as a summand. This is a modular accumulation procedure in which a single error propagates as a running error, with error recurring every 1368 symbol epochs. This symbol code span is longer than the span for a single block of the Reed-Solomon code, so a single running error is readily corrected during Reed-Solomon decoding. Running errors in the postcoded symbol decoding results from the postcoding comb filter 326 are curtailed by the multiplexer 3261 being placed into its first state during the entirety of each data segment containing field sync, as well as for four symbol epochs at the beginning of each data segment. When this control signal is in its first state, the multiplexer 3261 reproduces as its output signal ideal symbol decoding results supplied from memory in the controller 28. The introduction of ideal symbol decoding results into the multiplexer 3261 output signal halts a running error. The 16.67 millisecond duration of an NTSC video field exhibits phase slippage against the 24.19 millisecond duration of a DTV data field, so the DTV data segments containing field sync eventually scan the entire NTSC frame raster. The 525 lines in the NTSC frame raster each contain 684 symbol epochs, for a total of 359,100 symbol epochs. Since this is somewhat less than 432 times the 832 symbol epochs in a DTV data segment containing field sync, one can guess with reasonable confidence that running errors of duration longer than 432 data fields will be expunged by the multiplexer 3261 reproducing ideal symbol decoding results during DTV data segments containing field sync. There is also phase slippage between data segments, for the start code groups of which ideal symbol decoding results are available, and NTSC video scan lines. One can estimate 359,100 symbol epochs, which is 89,775 times the four symbol epochs in a code start group, are scanned during 89,775 consecutive data segments. Since there are 313 data segments per DTV data field, one can guess with reasonable confidence that running errors of duration longer than 287 data fields will be expunged by the multiplexer 3261 reproducing ideal symbol decoding results during the code start groups. The two sources of suppression of running errors are reasonably independent of each other, so running errors of duration longer than two hundred or so data fields are quite unlikely. Furthermore, if NTSC co-channel interference dips low at a time when the running error recurs, to condition the multiplexer 3261 for reproducing the response of the data-slicer 22 as its output signal, the error may be corrected earlier than would otherwise be the case.

The FIG. 8 NTSC-rejection comb filter 320 is quite good in suppressing demodulation artifacts generated in response to analog TV horizontal synchronizing pulses, as well as suppressing many of the demodulation artifacts generated in response to analog TV vertical synchronizing pulses and equalizing pulses. These artifacts are the co-channel interference with highest energy. Except where there is scan-line-to-scan-line change in the video content of the analog TV signal over the period of two scan lines, the NTSC-rejection comb filter 320 provides reasonably good suppression of that video content regardless of its color. The suppression of the FM audio carrier of the analog TV signal is reasonably good, in case it has not been suppressed by a tracking rejection filter in the symbol synchronization and equalization circuitry 16. Artifacts of most analog TV color bursts are suppressed in the NTSC-rejection comb filter 320 response, too. Furthermore, the filtering provided by the NTSC-rejection comb filter 320 is "orthogonal" to the NTSC-interference rejection built into the trellis decoding procedures.

Figure 9:
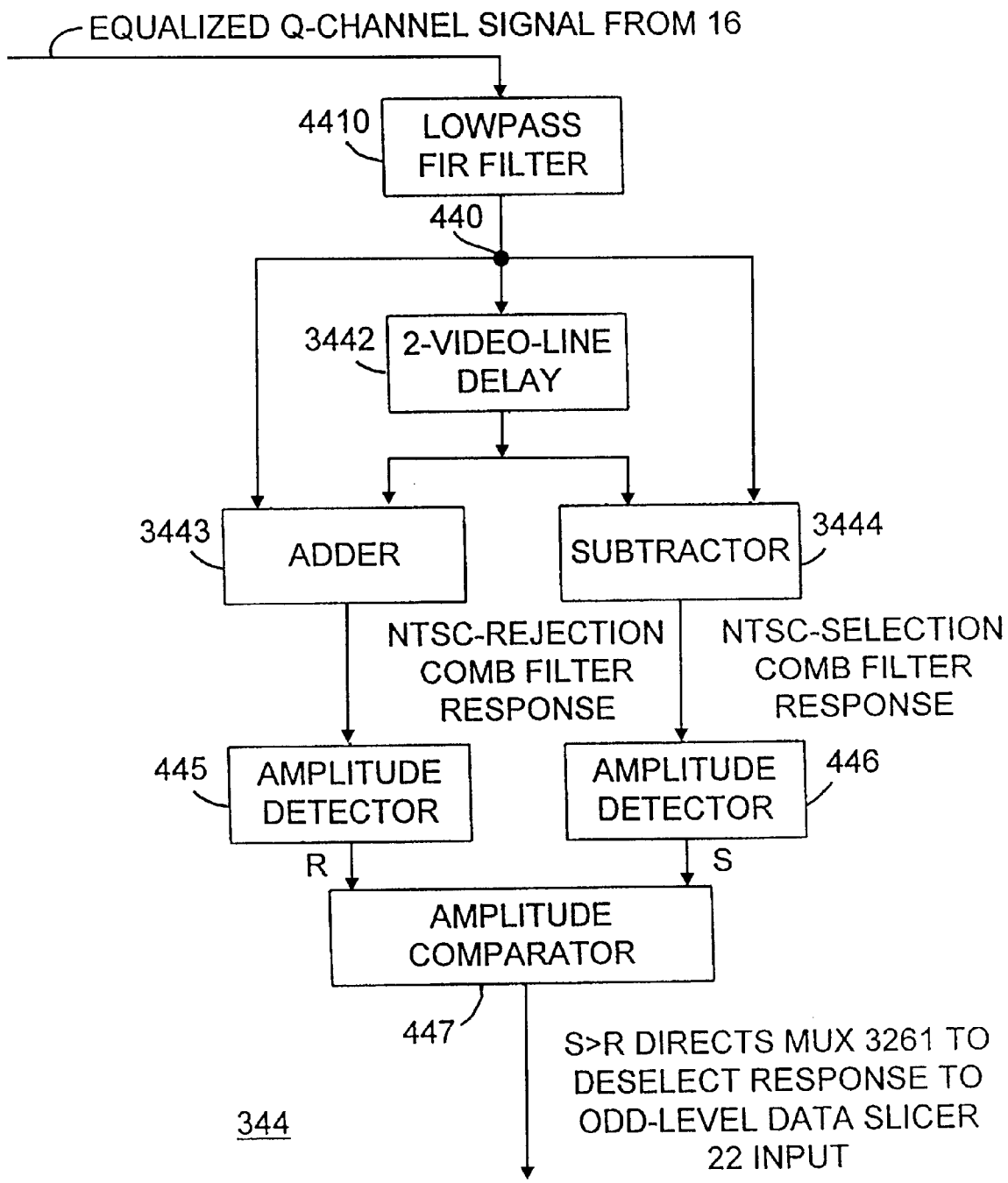
FIG. 9 is a block schematic diagram showing details of the FIG. 2 NTSC co-channel interference detector when a 2-video-line delay is employed therewithin.

FIG. 9 is a block schematic diagram showing details of a species 344 of the FIG. 2 NTSC co-channel interference detector 44 with a third delay element 3442 therewithin providing a 2-video-line delay of 1368 symbol epochs to Q-channel signal applied to the node 440. The third linear combiner is a digital adder 3443 additively combining the differentially-delayed Q-channel signal to generate the comb filter response supplied to the amplitude detector 445 in which response artifacts of NTSC co-channel interference are rejected. The fourth linear combiner is a digital subtractor 3444 differentially combining differentially-delayed Q-channel signal from the symbol synchronization and equalization circuitry 16 to generate the comb filter response supplied to the amplitude detector 446 in which response artifacts of NTSC co-channel interference are selected. This NTSC co-channel interference detector 344 is especially well suited for use in the FIG. 1 DTV signal receiver when it uses the species 320 of the NTSC-rejection comb filter 20 and the species 326 of the postcoding comb filter 26.

Figure 10:
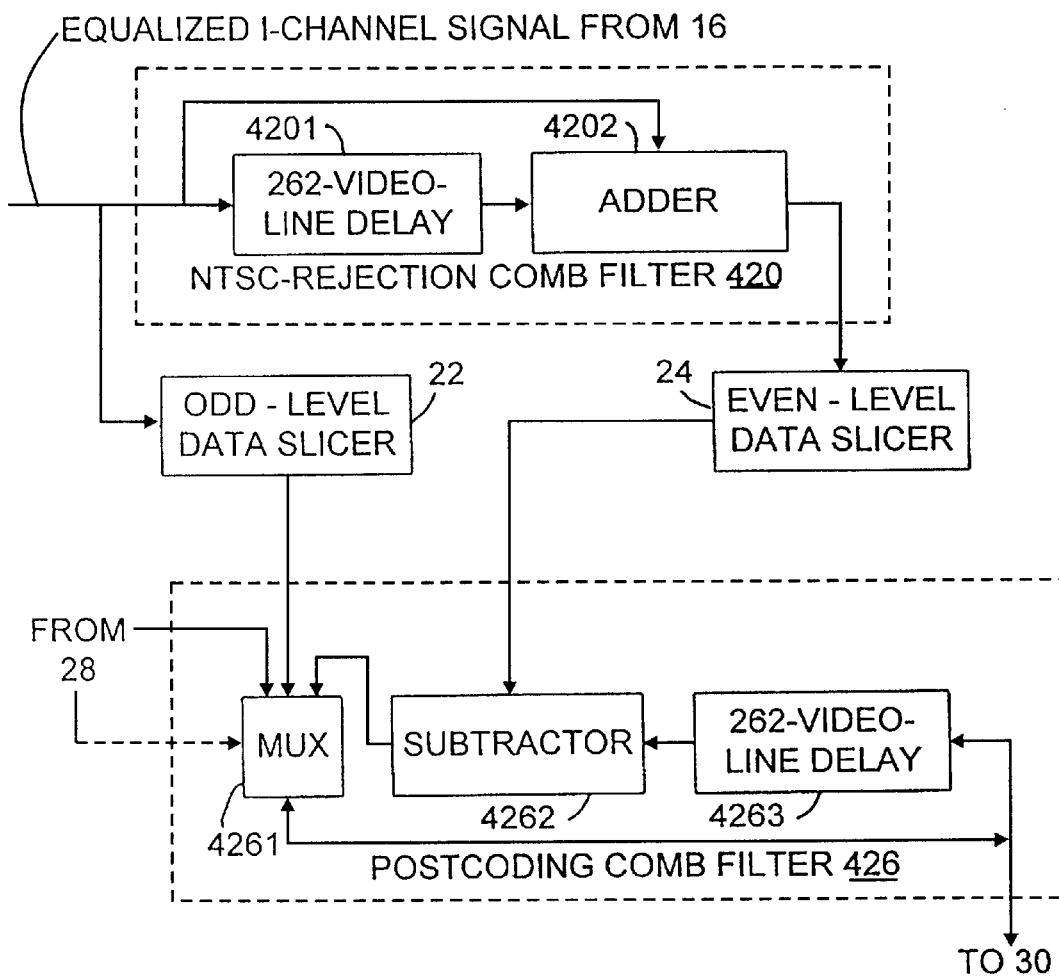
FIG. 10 is a block schematic diagram showing details of a portion of the FIG. 1 DTV signal receiver when the NTSC-rejection comb filter employs a 262-video-line delay.

FIG. 10 is a block schematic diagram showing details of a portion of the FIG. 1 DTV signal receiver using a species 420 of the NTSC-rejection comb filter 20 and a species 426 of the postcoding comb filter 26. The NTSC-rejection comb filter 420 uses a first delay device 4201 exhibiting a delay of 179,208 symbol epochs, which delay is substantially equal to the period of 262 horizontal scanning lines of an analog TV signal, and the postcoding comb filter 426 uses a second delay device 4261 also exhibiting such delay. An adder 4202 serves as the first linear combiner in the NTSC-rejection comb filter 420, and a modulo-8 subtractor 4262 serves as the second linear combiner in the postcoding comb filter 426.

A species 4261 of the multiplexer 261 is controlled by a multiplexer control signal that is in its second state most of the time when it is determined there is insufficient NTSC co-channel interference to cause uncorrectable error in the output signal from the data-slicer 22 and that is in its third state most of the time when it is determined there is sufficient NTSC co-channel interference to cause uncorrectable error in the output signal from the data-slicer 22. The DTV signal receiver preferably contains circuitry for detecting field-to-field change in the NTSC co-channel interference, so that the controller 28 can withhold supplying the third state of the multiplexer 4261 control signal under such conditions.

The multiplexer 4261 is conditioned by its control signal being in its third state to feed back the modulo-8 sum results of the adder 4262, as delayed 179,208 symbol epochs by the delay device 4263, to the adder 4262 as a summand. This is a modular accumulation procedure in which a single error propagates as a running error, with error recurring every 179,208 symbol epochs. This symbol code span is longer than the span for a single block of the Reed-Solomon code, so a single running error is readily corrected during Reed-Solomon decoding. Running errors in the postcoded symbol decoding results from the postcoding comb filter 426 are curtailed by the multiplexer 4261 being placed into its first state during the entirety of each data segment containing field sync, as well as for four symbol epochs at the beginning of each data segment. When this control signal is in its first state, the multiplexer 4261 reproduces as its output signal ideal symbol decoding results supplied from memory in the controller 28. The introduction of ideal symbol decoding results into the multiplexer 4261 output signal halts a running error. The maximum number of data fields required to expunge running error in the multiplexer 4261 output signal is presumably substantially the same as required to expunge running error in the multiplexer 3261 output signal. However, the number of times the error recurs in that period is lower by a factor of 131.

The FIG. 10 NTSC-rejection comb filter 420 suppresses most demodulation artifacts generated in response to analog TV vertical synchronizing pulses and equalizing pulses, as well as suppressing all the demodulation artifacts generated in response to analog TV horizontal synchronizing pulses. These artifacts are the co-channel interference with highest energy. Also, the NTSC-rejection comb filter 420 suppresses artifacts arising from the video content of the analog TV signal that does not change from field to field or line-to-line, getting rid of stationary patterns irrespective of their horizontal spatial frequency or color. Artifacts of most analog TV color bursts are suppressed in the NTSC-rejection comb filter 420 response, too.

Figure 11:
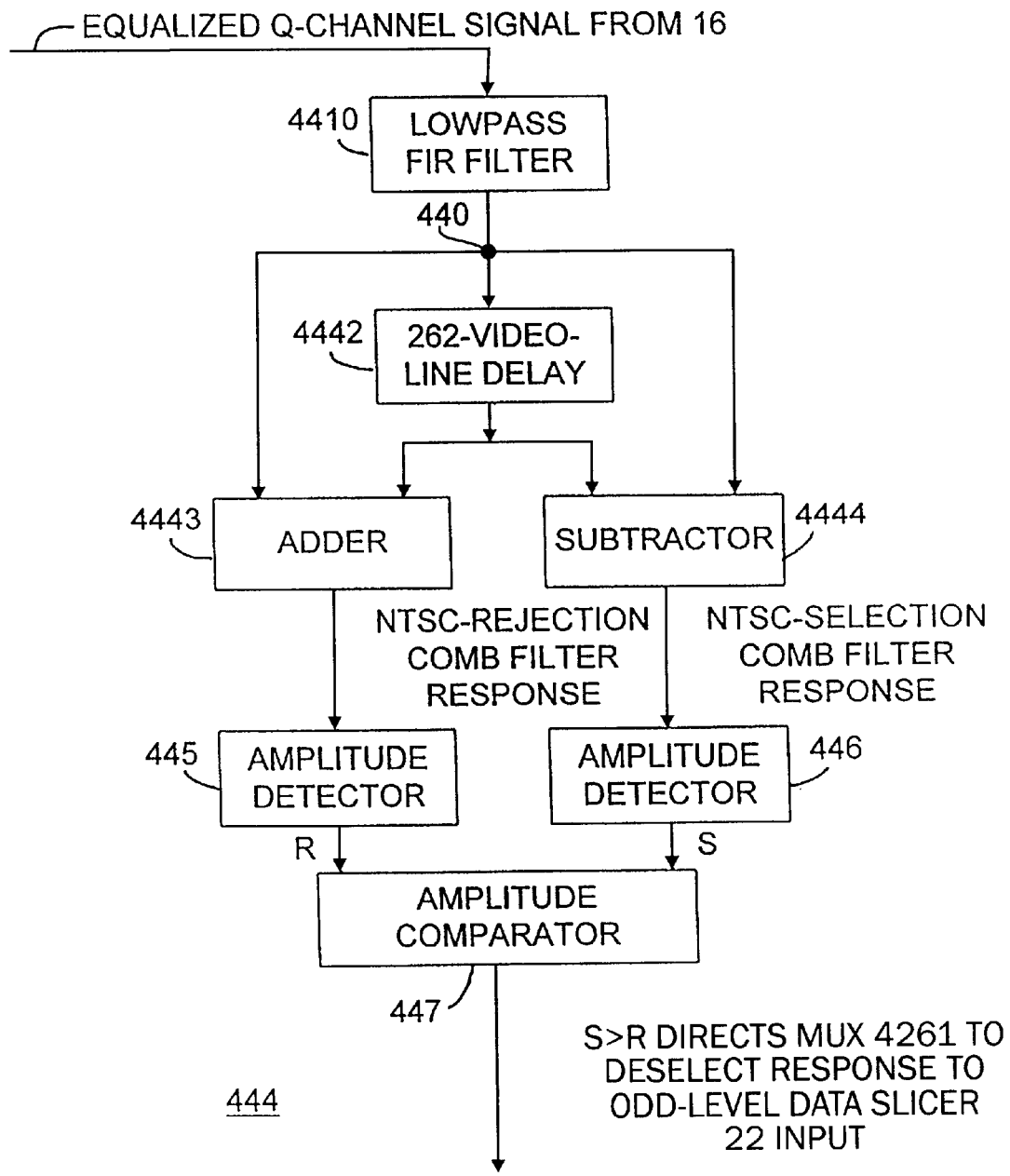
FIG. 11 is a block schematic diagram showing details of the FIG. 2 NTSC co-channel interference detector when a 262-video-line delay is employed therewithin.

FIG. 11 is a block schematic diagram showing details of a species 444 of the FIG. 2 NTSC co-channel interference detector 44 with a third delay element 4442 therewithin providing a 262-video-line delay of 179,208 symbol epochs to Q-channel signal applied to the node 440. The third linear combiner is a digital adder 4443 additively combining the differentially-delayed Q-channel signal to generate the comb filter response supplied to the amplitude detector 445 in which response artifacts of NTSC co-channel interference are rejected. The fourth linear combiner is a digital subtractor 4444 differentially combining differentially-delayed Q-channel signal from the symbol synchronization and equalization circuitry 16 to generate the comb filter response supplied to the amplitude detector 446 in which response artifacts of NTSC co-channel interference are selected. This NTSC co-channel interference detector 444 is especially well suited for use in the FIG. 1 DTV signal receiver when it uses the species 420 of the NTSC-rejection comb filter 20 and the species 426 of the postcoding comb filter 26.

Figure 12:
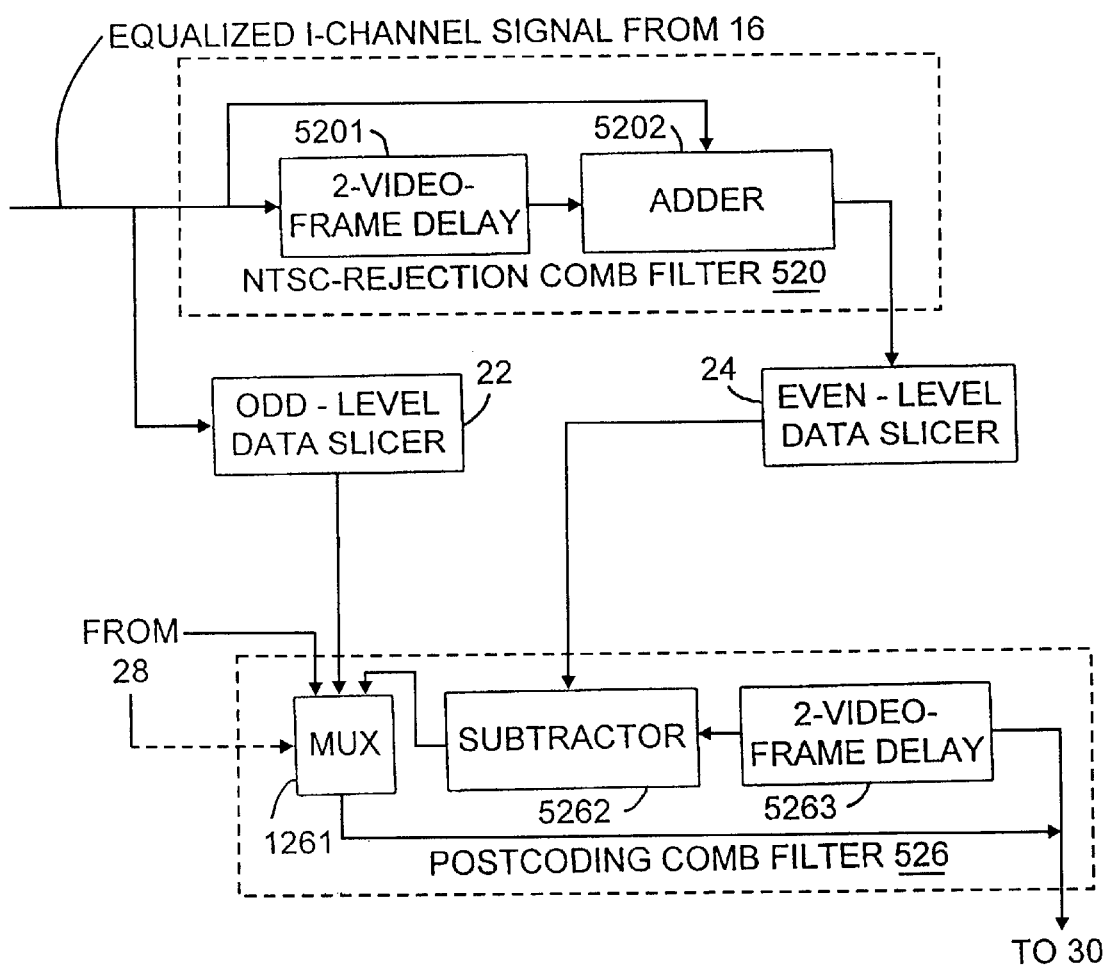
FIG. 12 is a block schematic diagram showing details of a portion of the FIG. 1 DTV signal receiver when the NTSC-rejection comb filter employs a 2-video-frame delay.

FIG. 12 is a block schematic diagram showing details of a portion of the FIG. 1 DTV signal receiver using a species 520 of the NTSC-rejection comb filter 20 and a species 526 of the postcoding comb filter 26. The NTSC-rejection comb filter 520 uses a first delay device 5201 exhibiting a delay of 718.200 symbol epochs, which delay is substantially equal to the period of two frames of an analog TV signal, and the postcoding comb filter 526 uses a second delay device 5261 also exhibiting such delay. A subtractor 5202 serves as the first linear combiner in the NTSC-rejection comb filter 520, and a modulo-8 adder 5262 serves as the second linear combiner in the postcoding comb filter 526.

A species 5261 of the multiplexer 261 is controlled by a multiplexer control signal that is in its second state most of the time when it is determined there is insufficient NTSC co-channel interference to cause uncorrectable error in the output signal from the data-slicer 22 and that is in its third state most of the time when it is determined there is sufficient NTSC co-channel interference to cause uncorrectable error in the output signal from the data-slicer 22. The DTV signal receiver preferably contains circuitry for detecting change between alternate frames in the NTSC co-channel interference, so that the controller 28 can withhold supplying the third state of the multiplexer 5261 control signal under such conditions.

The multiplexer 5261 is conditioned by its control signal being in its third state to feed back the modulo-8 sum results of the adder 5262, as delayed 718,200 symbol epochs by the delay device 5263, to the adder 5262 as a summand. This is a modular accumulation procedure in which a single error propagates as a running error, with error recurring every 718,200 symbol epochs. This symbol code span is longer than the span for a single block of the Reed-Solomon code, so a single running error is readily corrected during Reed-Solomon decoding. Running errors in the postcoded symbol decoding results from the postcoding comb filter 526 are curtailed by the multiplexer 5261 being placed into its first state during the entirety of each data segment containing field sync, as well as for four symbol epochs at the beginning of each data segment. When this control signal is in its first state, the multiplexer 5261 reproduces as its output signal ideal symbol decoding results supplied from memory in the controller 28. The introduction of ideal symbol decoding results into the multiplexer 5261 output signal halts a running error. The maximum number of data fields required to expunge running error in the multiplexer 5261 output signal is presumably substantially the same as required to expunge running error in the multiplexer 3261 output signal. However, the number of times the error recurs in that period is lower by a factor of 525.

The FIG. 12 NTSC-rejection comb filter 520 suppresses all demodulation artifacts generated in response to analog TV vertical synchronizing pulses and equalizing pulses, as well as suppressing all the demodulation artifacts generated in response to analog TV horizontal synchronizing pulses. These artifacts are the co-channel interference with highest energy. Also, the NTSC-rejection comb filter 520 suppresses artifacts arising from the video content of the analog TV signal that does not change over two frames, getting rid of such very stationary patterns irrespective of their spatial frequency or color. Artifacts of all analog TV color bursts are suppressed in the NTSC-rejection comb filter 520 response, too.

Figure 13:
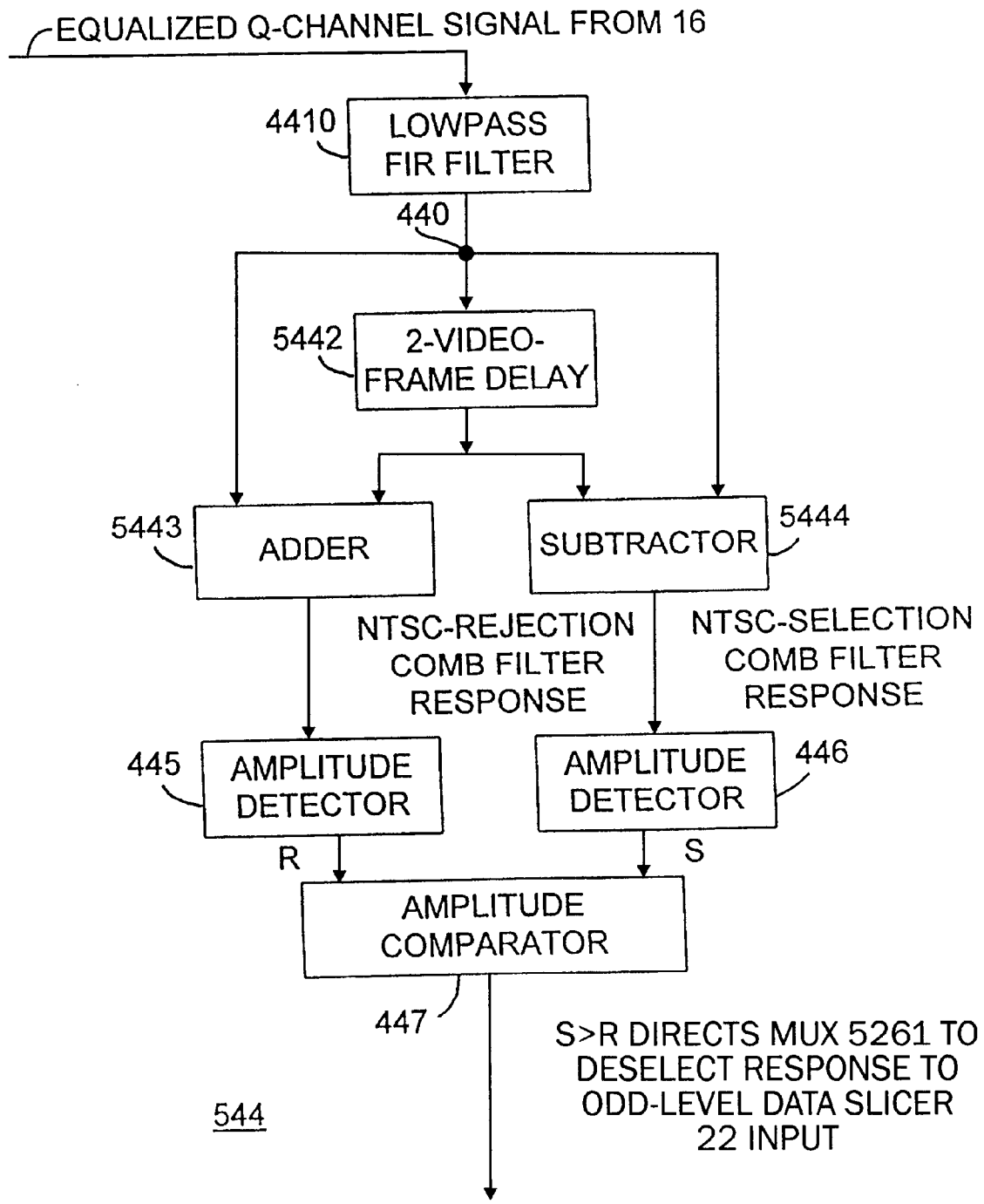
FIG. 13 is a block schematic diagram showing details of the FIG. 2 NTSC co-channel interference detector when a 2-video-frame delay is employed therewithin.

FIG. 13 is a block schematic diagram showing details of a species 544 of the FIG. 2 NTSC co-channel interference detector 44 with a third delay element 5442 therewithin providing a 2-video-frame delay of 718,200 symbol epochs to Q-channel signal applied to the node 440. The third linear combiner is a digital adder 5443 additively combining the differentially-delayed Q-channel signal to generate the comb filter response supplied to the amplitude detector 445 in which response artifacts of NTSC co-channel interference are rejected. The fourth linear combiner is a digital subtractor 5444 differentially combining differentially-delayed Q-channel signal from the symbol synchronization and equalization circuitry 16 to generate the comb filter response supplied to the amplitude detector 446 in which response artifacts of NTSC co-channel interference are selected. This NTSC co-channel interference detector 544 is especially well suited for use in the FIG. 1 DTV signal receiver when it uses the species 520 of the NTSC-rejection comb filter 20 and the species 526 of the postcoding comb filter 26.

One skilled in the art of television system design will discern other properties of correlation and anti-correlation in analog TV signals that can be exploited in the design of NTSC-rejection filters of still other types than those shown in FIGS. 4, 6, 8, 10 and 12. The use of NTSC-rejection filters that cascade two NTSC-rejection filters of the types already disclosed increases the 2N levels of the baseband signals to (8N−1) data levels, which increases the difficulty of data slicing during symbol decoding. Such filters may be required to overcome particularly bad co-channel interference problems despite their shortcoming of reducing signal-to-noise for random noise interference with symbol decoding. Cascading filters to improve NTSC rejection and selection in the co-channel interference detector has less drawback associated with it.

FIG. 14 illustrates cascading of filters to improve NTSC rejection and selection in a species 644 of the co-channel interference detector 44 that can be considered to be a modification of the FIG. 13 co-channel interference detector 544. The response of the FIR digital lowpass filter 4410 to equalized Q-channel signal from the symbol synchronization and equalization circuitry 16 is applied to the node 440. There is a saving in hardware if the comb filter section requiring the longest delay is earliest in the cascade, since the same longest delay element can be used both by the NTSC-reject comb filter and by the NTSC-select comb filter. As in the FIG. 13 co-channel interference detector 544, the signal at the node 440 is supplied to the 2-video-frame delay element 5442 in the FIG. 14 co-channel interference detector 644; and the resulting differentially delayed signals are additively combined by the adder 5443 and differentially combined by the subtractor 5444.

The sum response from the adder 5443 is subjected to further NTSC-rejection filtering to generate the NTSC-rejection comb filter response supplied to the amplitude detector 445. More particularly, a delay device 6441 provides 6-symbol differential delay to the sum response from the adder 5443, and the differentially delayed sum responses from the adder 5443 are additively combined by a digital adder 6442 to generate the NTSC-rejection comb filter response supplied to the amplitude detector 445.

The difference response from the subtractor 5444 is subjected to further NTSC-rejection filtering to generate the NTSC-selection comb filter response supplied to the amplitude detector 446. More particularly, a delay device 6443 provides 6-symbol differential delay to the difference response from the subtractor 5444, and the differentially delayed difference responses from the subtractor 5444 are differentially combined by a digital subtractor 6444 to generate the NTSC-selection comb filter response supplied to the amplitude detector 446. The results of amplitude detection by the amplitude detectors 445 and 446 are compared by an amplitude comparator 447. The amplitude comparator 447 supplies an output bit indicative of whether or not the response of the amplitude detector 446 substantially exceeds the response of the amplitude detector 445. This output bit is used for selecting between the second and third states of multiplexer 261 operation in the FIG. 1 DTV signal receiver which uses the co-channel interference detector 644 as its co-channel interference detector 44. The cascade filtering in the co-channel interference detector 644 utilizes the temporal comb filtering between alternative NTSC video frames to suppress NTSC artifacts arising from synchronizing information and static video components. The cascade filtering in the co-channel interference detector 644 utilizes intraframe spatial comb filtering to suppress NTSC artifacts arising from dynamic video components.

FIG. 15 further illustrates cascading of filters to improve NTSC rejection and selection in another species 744 of the co-channel interference detector 44 that can be considered to be a modification of the FIG. 13 co-channel interference detector 544. The equalized Q-channel signal from the symbol synchronization and equalization circuitry 16 is applied directly to the node 440, the FIR digital lowpass filter 4410 being unnecessary since the second stage of comb filtering suppresses artifacts of the audio carrier of any co-channel interfering NTSC analog TV signal. As in the FIG. 13 co-channel interference detector 544, the signal at the node 440 is supplied to the 2-video-frame delay element 5442 in the FIG. 15 co-channel interference detector 644; and the resulting differentially delayed signals are additively combined by the adder 5443 and differentially combined by the subtractor 5444.

The sum response from the adder 5443 is subjected to further NTSC-rejection filtering to generate the NTSC-rejection comb filter response supplied to the amplitude detector 445. More particularly, a delay device 7441 provides 12-symbol differential delay to the sum response from the adder 5443, and the differentially delayed sum responses from the adder 5443 are differentially combined by a digital subtractor 7442 to generate the NTSC-rejection comb filter response supplied to the amplitude detector 445.

The difference response from the subtractor 5444 is subjected to further NTSC-rejection filtering to generate the NTSC-selection comb filter response supplied to the amplitude detector 446. More particularly, a delay device 7443 provides 12-symbol differential delay to the difference response from the subtractor 5444, and the differentially delayed difference responses from the subtractor 5444 are additively combined by a digital adder 7444 to generate the NTSC-selection comb filter response supplied to the amplitude detector 446. The results of amplitude detection by the amplitude detectors 445 and 446 are compared by an amplitude comparator 447. The amplitude comparator 447 supplies an output bit indicative of whether or not the response of the amplitude detector 446 substantially exceeds the response of the amplitude detector 445. This output bit is used for selecting between the second and third states of multiplexer 261 operation in the FIG. 1 DTV signal receiver which uses the co-channel interference detector 744 as its co-channel interference detector 44. The cascade filtering in the co-channel interference detector 744 utilizes the temporal comb filtering between alternative NTSC video frames to suppress NTSC artifacts arising from synchronizing information and static video components. The cascade filtering in the co-channel interference detector 744 utilizes intraframe spatial comb filtering to suppress NTSC artifacts arising from audio components and dynamic video components.

FIG. 16 shows modification of the FIG. 1 DTV signal receiver as thusfar described, constructed in accordance with a further aspect of the invention so as to utilize a plurality of parallelly operated even-level data slicers A24, B24 and C24, each preceded by a respective NTSC-rejection comb filter and succeeded by a respective postcoding comb filter. The even-level data-slicer A24 converts the response of an NTSC-rejection filter A20 of a first type to first precoded symbol decoding results for application to a postcoding comb filter A26 of a first type. The even-level data-slicer B24 converts the response of an NTSC-rejection filter B20 of a second type to second precoded symbol decoding results for application to a postcoding comb filter B26 of a second type. The even-level data-slicer C24 converts the response of an NTSC-rejection filter C20 of a third type to third precoded symbol decoding results for application to a postcoding comb filter C26 of a third type. The odd-level data-slicer 22 supplies interim symbol decoding results to the postcoding comb filters A26, B26 and C26. The prefixes A, B and C in the identification numbers for the elements of FIG. 15 are different integers which will correspond to respective ones of the integers 1, 2, 3, 4 and 5 when receiver portions as shown in ones of FIGS. 4, 6, 8, 10 and 12 are employed.

A co-channel interference detector A44 of a first type determines from the Q-channel signal how effective the NTSC-rejection filter A20 of first type will be in reducing co-channel interference from an analog TV signal in the current equalized I-channel signal. A co-channel interference detector B44 of a second type determines from the Q-channel signal how effective the NTSC-rejection filter B20 of second type will be in reducing co-channel interference from an analog TV signal in the current equalized I-channel signal. A co-channel interference detector C44 of a third type determines from the Q-channel signal how effective the NTSC-rejection filter C20 of third type will be in reducing co-channel interference from an analog TV signal in the current equalized I-channel signal. The suppression of the pilot carrier in the Q-channel signal facilitates the co-channel interference detectors A44, B44 and C44 providing indications of the relative effectiveness of the NTSC-rejection comb filters A20, B20 and C20.

Symbol decoding selection circuitry 90 generates a best estimate of correct symbol decoding for application to the data assembler 30. This best estimate is generated by selecting among ideal symbol decoding results from the controller 28, interim symbol decoding results from the odd-level data slicer 22, and postcoded symbol decoding results from the postcoding comb filters A26, B26 and C26. The symbol decoding selection circuitry 90 responds to indications of effectiveness from the co-channel interference detectors A44, B44 and C44 to formulate this best estimate unless the controller 28 supplies further symbol selection information to the symbol decoding selection circuitry 90. The further symbol selection information supplied from the controller 28 includes indications of when synchronizing codes occur, which indications condition the best estimate to be made based on ideal symbol decoding results from the controller 28. The best estimate of symbol decoding results is used to correct the summation procedures in the matching comb filters A26, B26 and C26 in preferred embodiments of the FIG. 16 DTV signal receiver.

If the co-channel interference detectors A44, B44 and C44 all indicate lack of substantial artifacts from NTSC co-channel interference at times other than when synchronizing codes occur, the symbol decoding selection circuitry 90 responds to select the interim symbol decoding results from the odd-level data slicer 22 as the best estimate of correct symbol decoding results. This minimizes the effect of Johnson noise on symbol decoding.

If at least one of the co-channel interference detectors A44, B44 and C44 indicates substantial artifacts from NTSC co-channel interference at times other than when synchronizing codes occur, the symbol decoding selection circuitry 90 responds to select the postcoded symbol decoding results from the postcoding comb filter A26, B26 or C26 following the one of the NTSC-rejection comb filters A20, B20 and C20 that best suppresses artifacts from NTSC co-channel interference as determined by the co-channel interference detectors A44, B44 and C44.

The high-energy demodulation artifacts generated in response to analog TV synchronizing pulses, equalizing pulses, and color bursts are all suppressed when the NTSC-rejection comb filter A20 additively combines alternate video frames. Also, artifacts arising from the video content of the analog TV signal that does not change over two frames are suppressed, getting rid of stationary patterns irrespective of their spatial frequency or color. The co-channel interference detector A44 of FIG. 13 is used together with the FIG. 12 symbol decoding circuitry.

The remaining problem of suppressing demodulation artifacts primarily concerns suppressing those demodulation artifacts arising from frame-to-frame difference at certain pixel locations within the analog TV signal raster. These demodulation artifacts can be suppressed by intra-frame filtering techniques. The NTSC-rejection comb filter B20 and the postcoding comb filter B26 circuitry can be chosen to suppress remnant demodulation artifacts by relying on correlation in the horizontal direction, and the NTSC-rejection comb filter C20 and the postcoding comb filter C26 circuitry can be chosen to suppress remnant demodulation artifacts by relying on correlation in the vertical direction. Consider how such a design decision can be further implemented.

If the sound carrier of a co-channel interfering analog TV signal is not suppressed by SAW filtering or a sound trap in the IF amplifier chain 12, the NTSC-rejection comb filter B20 and the postcoding comb filter B26 circuitry are advantageously chosen to be of types like the NTSC-rejection comb filter 120 and the postcoding comb filter 126 circuitry of FIG. 4. The co-channel interference detector B44 of FIG. 5 is used together with the FIG. 4 symbol decoding circuitry.

If the sound carrier of a co-channel interfering analog TV signal is suppressed by SAW filtering or a sound trap in the IF amplifier chain 12, the NTSC-rejection comb filter B20 and the postcoding comb filter B26 circuitry are advantageously chosen to be of types like the NTSC-rejection comb filter 220 and the postcoding comb filter 226 circuitry of FIG. 6. This is because the anti-correlation between video components only six symbol epochs away from each other is usually better than the correlation between video components twelve symbol epochs away from each other. The co-channel interference detector B44 of FIG. 7 is used together with the FIG. 6 symbol decoding circuitry.

The optimal choice of the NTSC-rejection comb filter C20 and the postcoding comb filter C26 circuitry is less straightforward, because of the choice one must make (in consideration of field interlace in the interfering analog TV signal) whether to choose the temporally closer scan line in the same field or the spatially closer line in the preceding field to be combined with the current scan line in the NTSC-rejection comb filter C20. Choosing the temporally closer scan line in the same field is generally the better choice, since jump cuts between fields are less likely to ravage NTSC rejection by the comb filter C20. With such choice, the NTSC-rejection comb filter C20 and the postcoding comb filter C26 circuitry are of types like the NTSC-rejection comb filter 320 and the postcoding comb filter 326 circuitry of FIG. 8. The co-channel interference detector C44 of FIG. 9 is used together with the FIG. 8 symbol decoding circuitry.

With the other choice instead, the NTSC-rejection comb filter C20 and the postcoding comb filter C26 circuitry are of types like the NTSC-rejection comb filter 420 and the postcoding comb filter 426 circuitry of FIG. 10. The co-channel interference detector C44 of FIG. 11 is used together with the FIG. 10 symbol decoding circuitry.

What is claimed is:

1. A method for processing vestigial-sideband amplitude-modulated digital television signals in a digital television signal receiver, said method comprising steps of:

performing a complex demodulation of vestigial-sideband amplitude-modulated digital television signals susceptible to co-channel NTSC interference, to separate a received I-channel baseband signal and a received Q-channel baseband signal in an orthogonal relationship with said received I-channel baseband signal; and estimating whether artifacts of co-channel NTSC interference accompanying said received I-channel baseband signal are of significant level by determining whether further artifacts of co-channel NTSC interference accompanying said received Q-channel baseband signal exceed a prescribed level.

2. A method for determining whether or not comb filtering to suppress co-channel NTSC interference is to be employed before trellis decoding in a digital television signal receiver, said method comprising steps of:

performing a complex demodulation of vestigial-sideband amplitude-modulated digital television signals to separate a received I-channel baseband signal and a received Q-channel baseband signal in an orthogonal relationship with said received I-channel baseband signal;

determining whether or not artifacts of co-channel NTSC interference of significant level accompany said received Q-channel baseband signal;

if said artifacts of co-channel NTSC interference of significant level are determined not to accompany said received Q-channel baseband signal, symbol decoding responsive to said received I-channel baseband signal without comb filtering thereof to generate decoded symbols for said trellis decoding;

if said artifacts of co-channel NTSC interference of significant level are determined to accompany said received Q-channel baseband signal, comb filtering said received I-channel baseband signal to generate comb-filtered I-channel baseband signal;

if said artifacts of co-channel NTSC interference of significant level are determined to accompany said received Q-channel baseband signal, symbol decoding responsive to said comb-filtered I-channel baseband signal; and if said artifacts of co-channel NTSC interference of significant level are determined to accompany said received Q-channel baseband signal, postcoding the result of symbol decoding responsive to said comb-filtered I-channel baseband signal to generate decoded symbols for said trellis decoding.

3. The method of claim 2, further comprising steps of:

if said artifacts of co-channel NTSC interference of significant level are determined to accompany said received Q-channel baseband signal, conforming the comb-filtered response to said 1-channel baseband signal to an ideal comb filter response, prior to said symbol decoding responsive to said comb-filtered I-channel baseband signal; and if said artifacts of co-channel NTSC interference of significant level are determined not to accompany said received Q-channel baseband signal, equalizing said received I-channel baseband signal without comb filtering thereof, prior to said symbol decoding responsive to said received I-channel baseband signal without comb filtering thereof.

4. A digital television signal receiver comprising:

amplifier circuitry for supplying an amplified vestigial-sideband amplitude-modulated digital television signal apt to be accompanied by co-channel interfering analog television signal;

a complex demodulator responsive to said amplified vestigial-sideband amplitude-modulated digital television signal for supplying an I-channel baseband signal containing artifacts of any co-channel interfering analog television signal and a Q-channel baseband signal containing further artifacts of any co-channel interfering analog television signal;

symbol decoding apparatus for said I-channel baseband signal including a first data slicer for symbol decoding said I-channel baseband signal during first times, errors in first symbol decoding results from said first data slicer being correctable as long as said artifacts of any co-channel interfering analog television signal are generally below a significant level for said I-channel baseband signal; and an NTSC co-channel interference detector responsive to said Q-channel baseband signal, for detecting the presence of said further artifacts of any co-channel interfering analog television signal that are above a significant level for said Q-channel baseband signal, which said significant level for said Q-channel baseband signal corresponds to said significant level for said I-channel baseband signal.

5. The digital television signal receiver of claim 4, wherein said NTSC co-channel interference detector responsive to said Q-channel baseband signal comprises:

a delay device for delaying said Q-channel baseband signal to generate differentially delayed Q-channel baseband signals;

an adder for additively combining said differentially delayed Q-channel baseband signals to generate a sum signal;

a subtractor for differentially combining said differentially delayed Q-channel baseband signals to generate a difference signal;

a first amplitude detector for detecting the amplitude of said sum signal to generate a first amplitude detection response;

a second amplitude detector for detecting the amplitude of said difference signal to generate a second amplitude detection response; and an amplitude comparator for comparing said first and second amplitude detection responses and indicating said further artifacts of any co-channel interfering analog television signal are above said significant level for said Q-channel baseband signal when said first and second amplitude detection responses differ more than a prescribed amount.

6. The digital television signal receiver of claim 5, wherein said delay device within said NTSC co-channel interference detector generates said differentially delayed Q-channel baseband signals with differential delay of twelve symbol epochs.

7. The digital television signal receiver of claim 5, wherein said delay device within said NTSC co-channel interference detector generates said differentially delayed Q-channel baseband signals with differential delay of six symbol epochs.

8. The digital television signal receiver of claim 5, wherein said delay device within said NTSC co-channel interference detector generates said differentially delayed Q-channel baseband signals with differential delay of 1368 symbol epochs or two NTSC video scan lines.

9. The digital television signal receiver of claim 5, wherein said delay device within said NTSC co-channel interference detector generates said differentially delayed Q-channel baseband signals with differential delay of 179,208 symbol epochs or 262 NTSC video scan lines.

10. The digital television signal receiver of claim 5, wherein said delay device within said NTSC co-channel interference detector generates said differentially delayed Q-channel baseband signals with differential delay of 718,200 symbol epochs or two NTSC video frames.

11. The digital television signal receiver of claim 4, wherein said NTSC co-channel interference detector responsive to said Q-channel baseband signal comprises:

a first delay device for delaying said Q-channel baseband signal to generate differentially delayed Q-channel baseband signals;

a first adder for additively combining said differentially delayed Q-channel baseband signals to generate a first sum signal;

a first subtractor for differentially combining said differentially delayed Q-channel baseband signals to generate a first difference signal;

a second delay device for delaying said first sum signal to generate differentially delayed first sum signals;

a third delay device for delaying said first difference signal to generate differentially delayed first difference signals, said third delay device delaying said first difference signal similarly to said second delay device delaying said first sum signal;

a second adder for additively combining said differentially delayed first sum signals to generate a second sum signal;

a second subtractor for differentially combining said differentially delayed first difference signals to generate a second difference signal;

a first amplitude detector for detecting the amplitude of said second sum signal to generate a first amplitude detection response;

a second amplitude detector for detecting the amplitude of said second difference signal to generate a second amplitude detection response; and an amplitude comparator for comparing said first and second amplitude detection responses and indicating said further artifacts of any co-channel interfering analog television signal are above said significant level for said Q-channel baseband signal when said first and second amplitude detection responses differ more than a prescribed amount.

12. The digital television signal receiver of claim 4, wherein said NTSC co-channel interference detector responsive to said Q-channel baseband signal comprises:

a first delay device for delaying said Q-channel baseband signal to generate differentially delayed Q-channel baseband signals;

a first adder for additively combining said differentially delayed Q-channel baseband signals to generate a first sum signal;

a first subtractor for differentially combining said differentially delayed Q-channel baseband signals to generate a first difference signal;

a second delay device for delaying said first sum signal to generate differentially delayed first sum signals;

a third delay device for delaying said first difference signal to generate differentially delayed first difference signals, said third delay device delaying said first difference signal similarly to said second delay device delaying said first sum signal;

a second adder for additively combining said differentially delayed first difference signals to generate a second sum signal;

a second subtractor for differentially combining said differentially delayed first sum signals to generate a second difference signal;

a first amplitude detector for detecting the amplitude of said second sum signal to generate a first amplitude detection response;

a second amplitude detector for detecting the amplitude of said second difference signal to generate a second amplitude detection response; and an amplitude comparator for comparing said first and second amplitude detection responses and indicating said further artifacts of any co-channel interfering analog television signal are above said significant level for said Q-channel baseband signal when said first and second amplitude detection responses differ more than a prescribed amount.

13. The digital television signal receiver of claim 4, further comprising:

data synchronization circuitry for determining when symbols used for data synchronization appear in said I-channel baseband signal; and circuitry for generating ideal symbol decoding results when symbols used for data synchronization are determined to appear in said I-channel baseband signal; wherein said symbol coding apparatus further comprises:

a first delay device for exhibiting a delay of a prescribed first number of said symbol epochs, connected to respond to said I-channel baseband signal, thereby to generate differentially delayed I-channel baseband signals;

a first linear combiner which linearly combines said differentially delayed I-channel baseband signals, to generate a first comb filter response in which said artifacts of any co-channel interfering analog television signal are suppressed;

a second data slicer for symbol decoding said first comb filter response, for generating first precoded symbol decoding results;

a second linear combiner which linearly combines respective first and second input signals received thereby for supplying a respective output signal therefrom as a second comb filter response, said second linear combiner connected to receive said first precoded symbol decoding results as said respective first input signal thereof, one of said first and said second linear combiners being an adder and the other of said first and said second linear combiners being a subtractor;

a second delay device connected for delaying a respective input signal thereof said prescribed first number of symbol epochs to generate said second input signal of said second linear combiner;

a plural-input first multiplexer connected for supplying a respective output signal therefrom to said second delay device as said second input signal thereof, for receiving said ideal symbol decoding results as a first of its input signals, for receiving said interim symbol decoding results as a second of its input signals and for receiving said output signal of said second linear combiner as a third of its input signals, said first multiplexer being conditioned to reproduce as its output signal the first of its input signals when and only when symbols used for data synchronization are determined to appear in said I-channel baseband signal, said first multiplexer otherwise being conditioned to reproduce as its output signal the output signal of said second linear combiner when said NTSC co-channel interference detector detects the presence of said further artifacts of any co-channel interfering analog television signal being above said significant level for said Q-channel baseband signal, and said first multiplexer otherwise being conditioned to reproduce as its output signal the output signal of said first data slicer when said NTSC co-channel interference detector does not detect the presence of said further artifacts of any co-channel interfering analog television signal being above said significant level for said Q-channel baseband signal.

14. The digital television signal receiver of claim 13, wherein said NTSC co-channel interference detector responsive to said Q-channel baseband signal comprises:

a third delay device for delaying said Q-channel baseband signal said prescribed first number of symbol epochs to generate differentially delayed Q-channel baseband signals;

a third linear combiner which linearly combines said differentially delayed Q-channel baseband signals to generate a third comb filter response in which artifacts of any co-channel interfering analog television signal tend to be suppressed;

a fourth linear combiner which linearly combines said differentially delayed Q-channel baseband signals to generate a fourth comb filter response in which artifacts of any co-channel interfering analog television signal tend to be reinforced one of said third and said fourth linear combiners being an adder and the other of said third and said fourth linear combiners being a subtractor;

a first amplitude detector for detecting the amplitude of said third comb filter response to generate a first amplitude detection response;

a second amplitude detector for detecting the amplitude of said fourth comb filter response to generate a second amplitude detection response; and an amplitude comparator for comparing said first and second amplitude detection responses and indicating said further artifacts of any co-channel interfering analog television signal are above said significant level for said Q-channel baseband signal when said first and second amplitude detection responses differ more than a prescribed amount.

15. The digital television signal receiver of claim 14; wherein said first, second and third delay devices each provide differential delay of twelve symbol epochs; wherein said first and third linear combiners are subtractors; and wherein said second and fourth linear combiners are adders.

16. The digital television signal receiver of claim 14; wherein said first, second and third delay devices each provide differential delay of six symbol epochs; wherein said first and third linear combiners are adders; and wherein said second and fourth linear combiners are subtractors.

17. The digital television signal receiver of claim 14; wherein said first, second and third delay devices each provide differential delay of 1368 symbol epochs or two NTSC video scan lines; wherein said first and third linear combiners are adders; and wherein said second and fourth linear combiners are subtractors.

18. The digital television signal receiver of claim 14; wherein said first, second and third delay devices each provide differential delay of 179,208 symbol epochs or 262 NTSC video scan lines; wherein said first and third linear combiners are adders;

and wherein said second and fourth linear combiners are subtractors.

19. The digital television signal receiver of claim 14; wherein said first, second and third delay devices each provide differential delay of 718,200 symbol epochs or two NTSC video frames; wherein said first and third linear combiners are adders; and wherein said second and fourth linear combiners are subtractors.

\* \* \* \* \*